(12) United States Patent
Maxim et al.

(10) Patent No.: US 11,626,892 B1
(45) Date of Patent: Apr. 11, 2023

(54) MULTI-BAND RADIO FREQUENCY FRONT-END CIRCUIT

(71) Applicant: Qorvo US, Inc., Greensboro, NC (US)

(72) Inventors: George Maxim, Saratoga, CA (US); Baker Scott, San Jose, CA (US); Ali Tombak, Cary, NC (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 17/665,687

(22) Filed: Feb. 7, 2022

(51) Int. Cl.
  *H04B 1/00* (2006.01)
  *H01Q 1/52* (2006.01)
  *H01Q 5/335* (2015.01)
  *H04B 1/40* (2015.01)

(52) U.S. Cl.
  CPC ........... *H04B 1/0064* (2013.01); *H01Q 1/525* (2013.01); *H01Q 5/335* (2015.01); *H04B 1/40* (2013.01)

(58) Field of Classification Search
  CPC ........ H04B 1/0064; H04B 1/40; H01Q 5/335; H01Q 1/525
  See application file for complete search history.

(56) References Cited

U.S. PATENT DOCUMENTS

| | | | |
|---|---|---|---|
| 11,245,432 B2* | 2/2022 | Farahvash | H04B 1/40 |
| 2010/0225556 A1* | 9/2010 | Rofougaran | H01Q 3/30 |
| | | | 343/860 |
| 2022/0094047 A1* | 3/2022 | Kogure | H01Q 1/38 |
| 2022/0263535 A1* | 8/2022 | Tani | H04B 1/00 |

\* cited by examiner

*Primary Examiner* — Nguyen T Vo
(74) *Attorney, Agent, or Firm* — Withrow & Terranova, P.L.L.C.

(57) ABSTRACT

A multi-band radio frequency (RF) front-end circuit is provided. The multi-band RF front-circuit includes multiple RF circuits configured to amplify RF signals received and/or to be transmitted in multiple RF bands and/or polarizations via an antenna circuit. The antenna circuit includes multiple antenna tap points each coupled to a respective one of the RF circuits. Since each of the RF circuits has a respective impedance that can vary based on the RF bands, the antenna tap points are so positioned on the antenna circuit to each present a respective drive impedance that matches the respective impedance of a coupled RF circuit. Further, the antenna tap points are also positioned on the antenna circuit to cause desired RF isolations between the RF bands and/or the polarizations. Consequently, the multi-band RF front-end circuit can achieve optimal RF performance across a wide range of RF bands with reduced footprint and insertion losses.

22 Claims, 17 Drawing Sheets

MULTI-BAND RADIO FREQUENCY FRONT-END CIRCUIT

FIELD OF THE DISCLOSURE

The technology of the disclosure relates generally to a multi-band radio frequency (RF) front-end circuit.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

A mobile communication device includes an antenna element(s) configured to receive and/or radiate a radio frequency (RF) signal(s) in a variety of RF frequency bands and/or polarizations (e.g., horizontal and vertical polarizations). In this regard, FIG. 1 is a schematic diagram of an exemplary conventional RF front-end circuit 10 configured to transmit one or more RF transmit signals 12(1)-12(M) and receive one or more RF receive signals 14(1)-14(N).

The conventional RF front-end circuit 10 includes one or more power amplifiers (PAs) 16(1)-16(M) each configured to amplify a respective one of the RF transmit signals 12(1)-12(M). The conventional RF front-end circuit 10 includes one or more low-noise amplifiers (LNAs) 18(1)-18(N) each configured to amplify a respective one of the RF receive signals 14(1)-14(N). The conventional RF front-end circuit is coupled to a transceiver circuit 20, which is configured to generate the RF transmit signals 12(1)-12(M) and receive the RF receive signals 14(1)-14(N).

The conventional RF front-end circuit 10 is coupled to an antenna circuit 22 via a single antenna port 24. Thus, to transmit any of the RF transmit signals 12(1)-12(M) and receive any of the RF receive signals 14(1)-14(N) via the single antenna port 24, the conventional RF front-end circuit 10 further includes a switch circuit 26. The switch circuit 26 includes multiple switches (not shown) each coupled between the single antenna port 24 and a respective one of the PAs 16(1)-16(M) or a respective one of the LNAs 18(1)-18(N). At any given time, the switches in the switch circuit 26 can be individually toggled to couple one of the PAs 16(1)-16(M) and the LNAs 18(1)-18(N) to the single antenna port 24.

Each of the PAs 16(1)-16(M) can inherently exhibit a respective one of multiple load impedances $Z_{PA-1}$-$Z_{PA-M}$, which can be a complex impedance expressed as $Z_{PA-i}=R_{PA-i}\pm jX_{PA-i}$ ($1\leq i \leq M$). Likewise, each of the LNAs 18(1)-18(N) can inherently exhibit a respective one of multiple noise impedances $Z_{LNA-1}$-$Z_{LNA-N}$, which can be a complex impedance expressed as $Z_{LNA-i}=R_{LNA-i}\pm jX_{LNA-i}$ ($1\leq i \leq N$). Understandably, the load impedances $Z_{PA-1}$-$Z_{PA-M}$ can vary significantly depending on RF frequency bands of the RF transmit signals 12(1)-12(M). Similarly, the noise impedances $Z_{LNA-1}$-$Z_{LNA-M}$ can also vary significantly depending on RF frequency bands of the RF receive signals 14(1)-14(N). In contrast, the antenna circuit 22 typically exhibits a drive impedance $Z_{ANT}$ that is relatively constant. As such, it is necessary to match the drive impedance $Z_{ANT}$ to each of the load impedances $Z_{PA-1}$-$Z_{PA-M}$ and the noise impedances $Z_{LNA-1}$-$Z_{LNA-N}$ to help improve RF performance of the PAs 16(1)-16(M) and the LNAs 18(1)-18(N).

In this regard, the switch circuit 26 can further include multiple matching circuits (not shown) to match each of the load impedances $Z_{PA-1}$-$Z_{PA-M}$ and each of the noise impedances $Z_{LNA-1}$-$Z_{LNA-N}$ to the drive impedance $Z_{ANT}$. In addition, the matching circuits can also be configured to provide sufficient RF isolations between the RF transmit signals 12(1)-12(M) and/or the RF receive signals 14(1)-14(N), which is critical to meeting specific performance requirements, such as adjacent channel leakage ratio (ACLR), across a wide RF spectrum.

However, employing the switch circuit 26 with multiple switches and matching circuits may cause a footprint of the conventional RF front-end circuit 10 to increase significantly. Moreover, the switches and/or matching circuits can also introduce substantial insertion losses into the RF transmit signals 12(1)-12(M) and the RF receive signals 14(1)-14(N). As such, it is desirable to provide impedance matching and RF isolation without employing the switch circuit 26.

SUMMARY

Embodiments of the disclosure relate to a multi-band radio frequency (RF) front-end circuit. The multi-band RF front-circuit includes multiple RF circuits (e.g., low-noise amplifiers and/or power amplifiers) configured to amplify RF signals received and/or to be transmitted in multiple RF bands and/or polarizations via an antenna circuit. The antenna circuit includes multiple antenna tap points each coupled to a respective one of the RF circuits. Given that each of the RF circuits has a respective impedance (e.g., noise impedance and/or load impedance) that can vary based on the RF bands, the antenna tap points are so positioned on the antenna circuit to each present a respective drive impedance that matches the respective impedance of a coupled RF circuit. In addition, the antenna tap points are also positioned on the antenna circuit to cause desired RF isolations between the RF bands and/or the polarizations. As a result, the multi-band RF front-end circuit can achieve optimal RF performance across a wide range of RF bands with reduced footprint and insertion losses.

In one aspect, a multi-band RF front-end circuit is provided. The multi-band RF front-end circuit includes multiple RF circuits each having a respective impedance. The multi-band RF front-end circuit also includes an antenna circuit. The antenna circuit includes multiple antenna tap points each coupled to a respective one of the multiple RF circuits. The multiple antenna tap points are each positioned on the antenna circuit to present a respective tap impedance to thereby match the respective impedance of the respective one of the multiple RF circuits. The multiple antenna tap points are also each positioned on the antenna circuit to distance from one or more related antenna tap points among the plurality of antenna tap points to thereby provide a respective RF isolation between the respective one of the multiple RF circuits and one or more related RF circuits among the multiple RF circuits that are coupled respectively to the one or more related antenna tap points.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 5A:
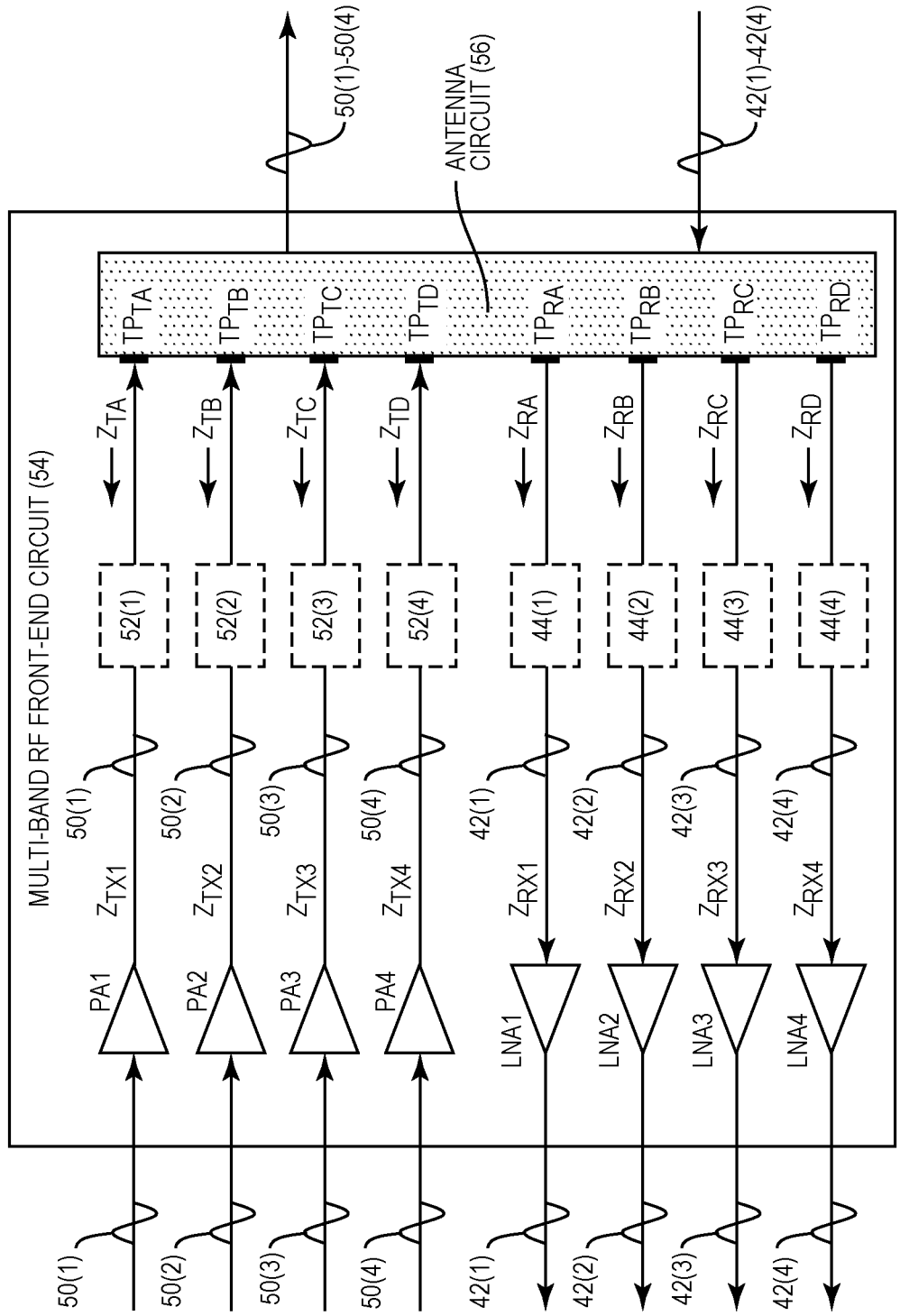
FIG. 5A is a schematic diagram of an exemplary multi-band RF front-end circuit wherein multiple receive tap points and multiple transmit tap points are positioned in an antenna circuit to provide impedance matching and RF isolation among multiple LNA circuits and multiple PA circuits.
Figure 5B:
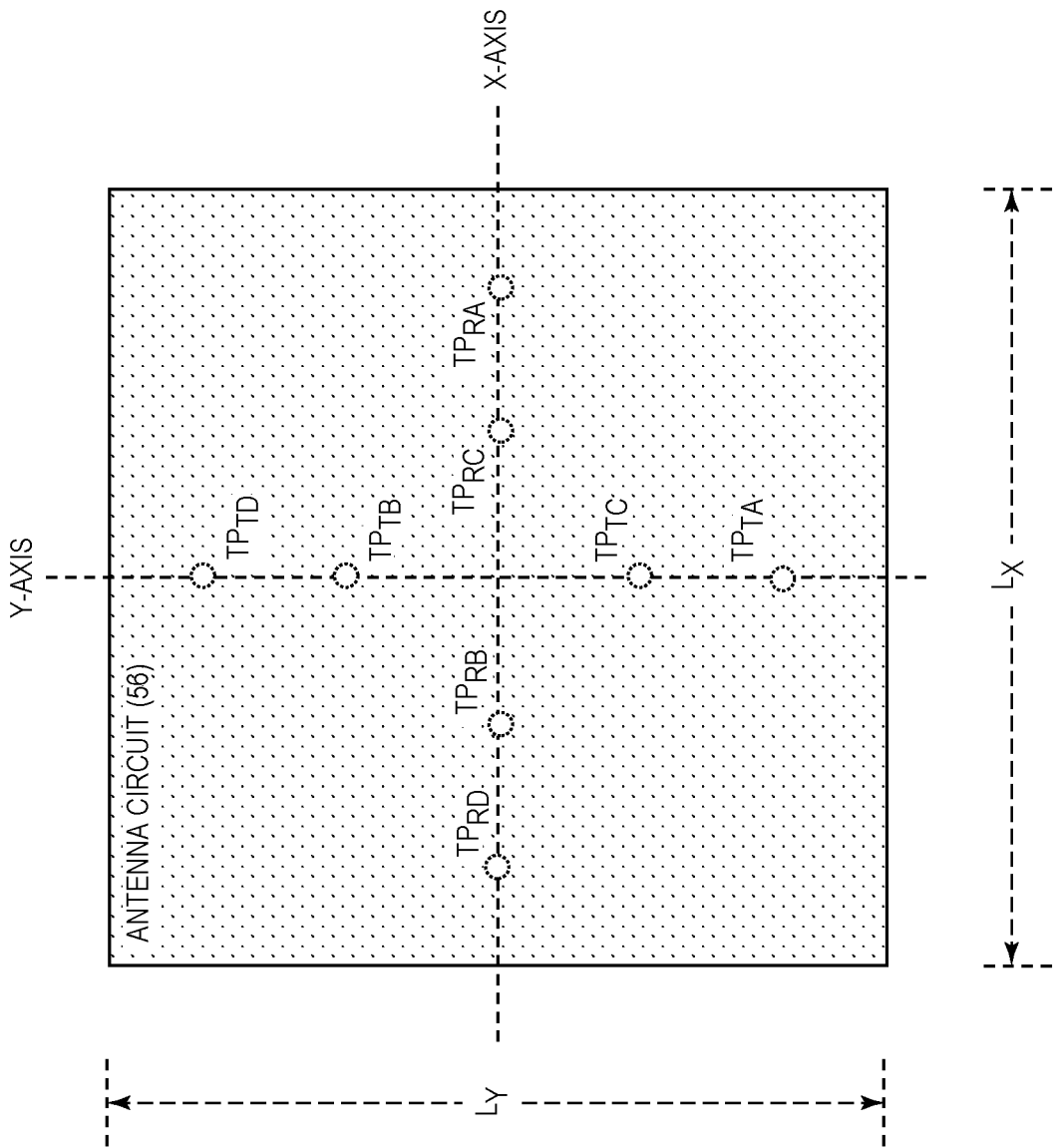
FIG. 5B is a schematic diagram illustrating an exemplary arrangement of the receive tap points and the transmit tap points in FIG. 5A for providing RF isolations among multiple RF receive signals that are received in a same receive polarization but different RF receive bands and multiple RF transmit signals that are transmitted in a same transmit polarization but different RF transmit bands.
Figure 5C:
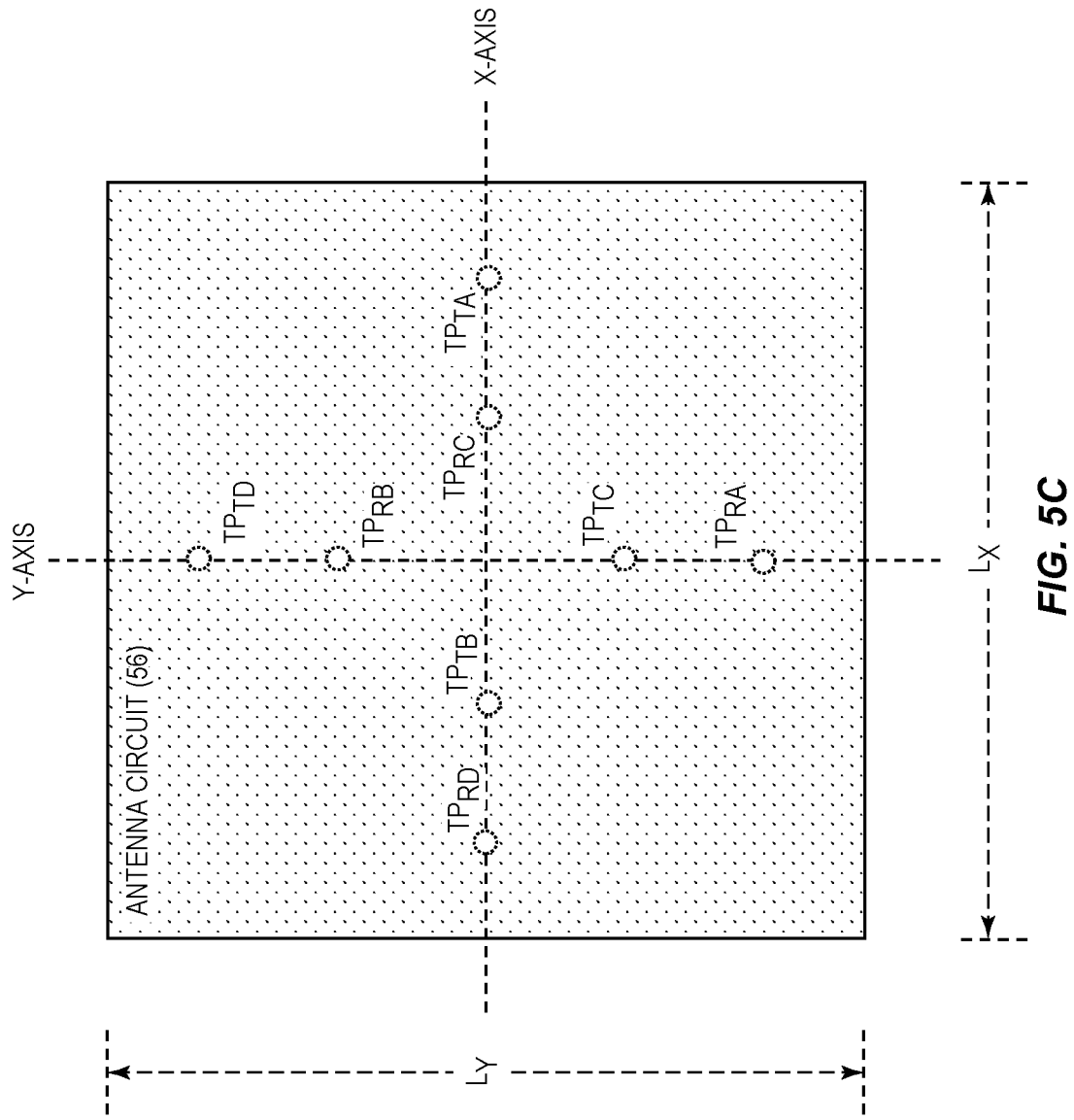
Figure 6:
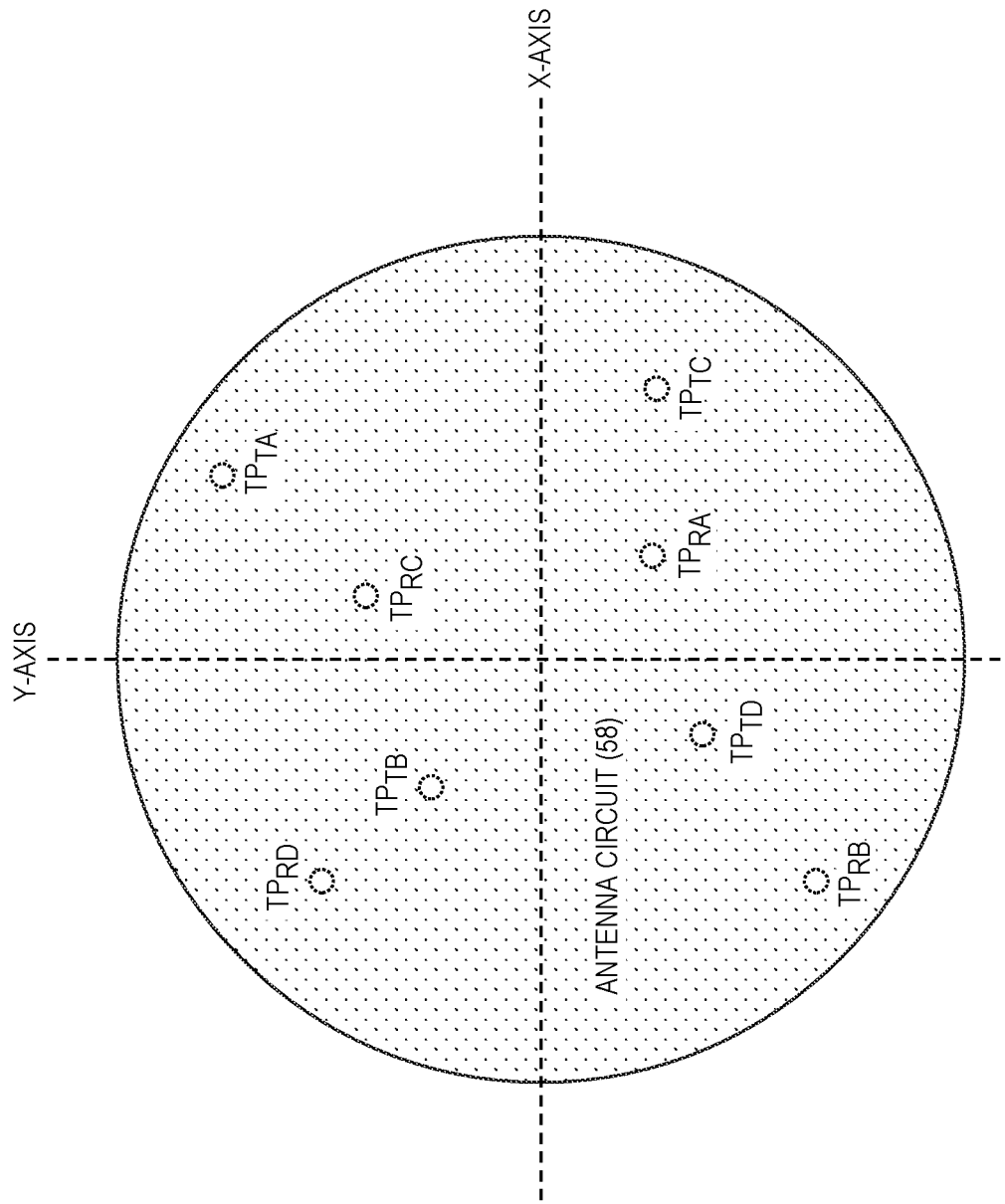
Figure 7A:
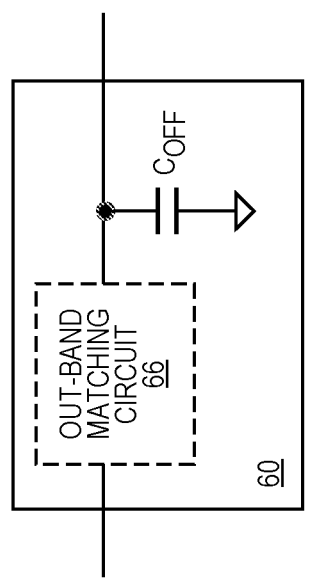
Figure 7C:
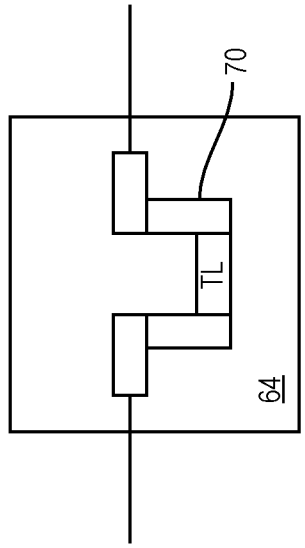
Figure 7B:
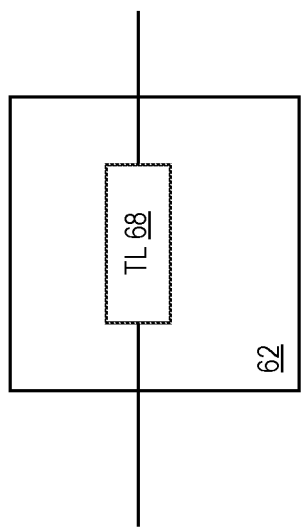

FIG. 5C is a schematic diagram illustrating an exemplary arrangement of the receive tap points and the transmit tap points in FIG. 5A for providing RF isolations among multiple RF receive signals that are received in different receive polarizations and different RF receive bands and multiple RF transmit signals that are transmitted in different transmit polarizations and different RF transmit bands;

FIG. 6 is a schematic diagram illustrating an exemplary arrangement of multiple receive tap points and multiple transmit tap points in a circular-shaped antenna circuit; and FIGS. 7A-7C are schematic diagrams providing exemplary illustrations of different coupling circuits that can be provided in the multi-band RF front-end circuit of FIG. 5A.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to a multi-band radio frequency (RF) front-end circuit. The multi-band RF front-circuit includes multiple RF circuits (e.g., low-noise amplifiers and/or power amplifiers) configured to amplify RF signals received and/or to be transmitted in multiple RF bands and/or polarizations via an antenna circuit. The antenna circuit includes multiple antenna tap points each coupled to a respective one of the RF circuits. Given that each of the RF circuits has a respective impedance (e.g., noise impedance and/or load impedance) that can vary based on the RF bands, the antenna tap points are so positioned on the antenna circuit to each present a respective drive impedance that matches the respective impedance of a coupled RF circuit. In addition, the antenna tap points are also positioned on the antenna circuit to cause desired RF isolations between the RF bands and/or the polarizations. As a result, the multi-band RF front-end circuit can achieve optimal RF performance across a wide range of RF bands with reduced footprint and insertion losses.

Figure 2A:
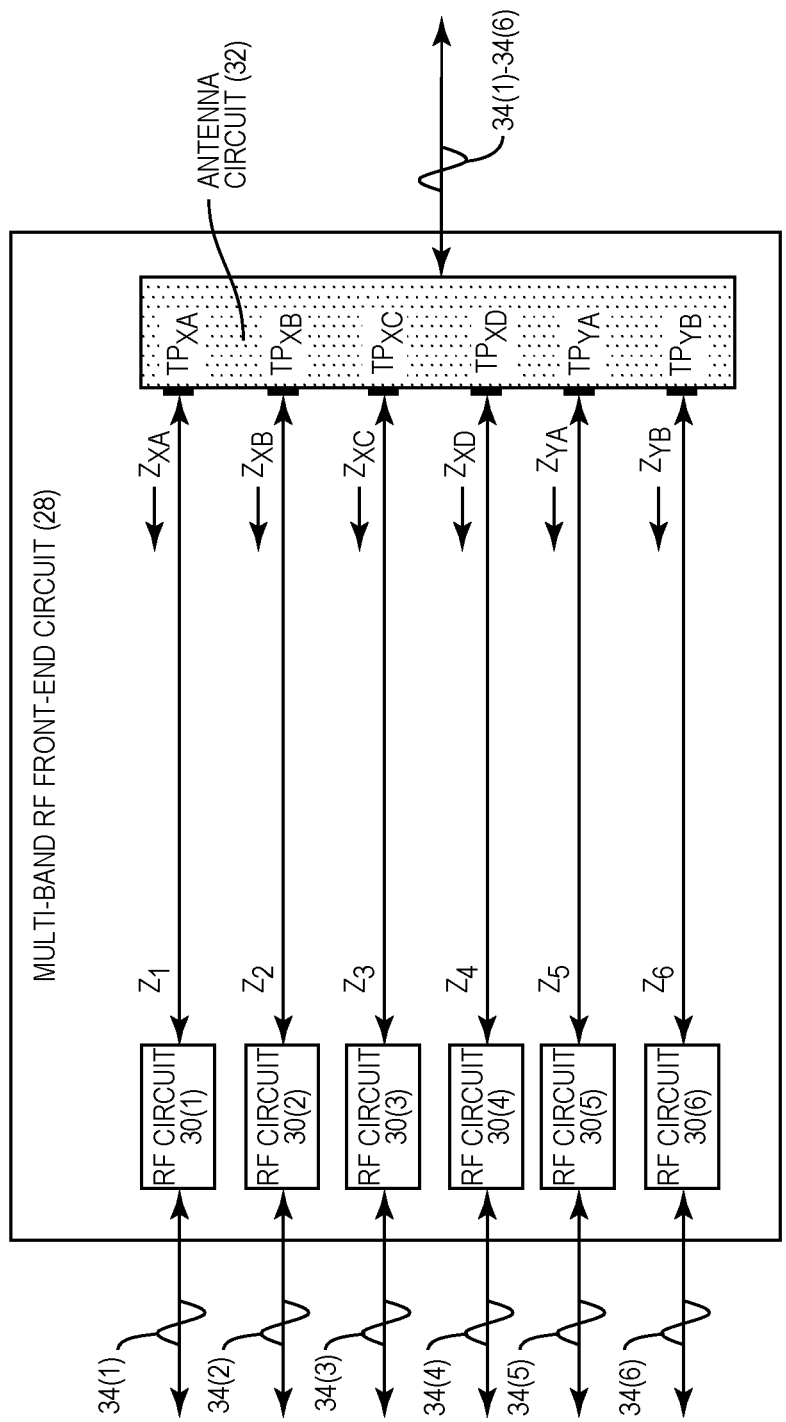
FIG. 2A is a schematic diagram of an exemplary multi-band RF front-end circuit configured according to embodiments disclosed herein to achieve optimal RF performance across a wide range of RF bands.

FIG. 2A is a schematic diagram of an exemplary multi-band RF front-end circuit 28 configured according to embodiments disclosed herein to achieve optimal RF performance across a wide range of RF bands. The multi-band RF front-end circuit 28 includes multiple RF circuits 30(1)-30(6), which can include low-noise amplifier (LNA) circuits and/or power amplifier (PA) circuits. Although only the RF circuits 30(1)-30(6) are illustrated, it should be appreciated that the multi-band RF front-end circuit 28 can include any suitable number of RF circuits.

The RF circuits 30(1)-30(6) are coupled to an antenna circuit 32 and configured to amplify multiple RF signals 34(1)-34(6), respectively. Notably, the RF signals 34(1)-34(6) can include RF receive signals received via the antenna circuit 32 in multiple RF receive bands/polarizations (e.g., horizontal and vertical polarizations) and/or RF transmit signals to be transmitted via the antenna circuit 32 in multiple RF transmit bands/polarizations. Each of the RF circuits 30(1)-30(6) inherently has a respective one of multiple impedances Z1-Z6, which can be noise impedances when the RF circuits 30(1)-30(6) are LNA circuits or load impedances when the RF circuits 30(1)-30(6) are PA circuits.

Figure 1:
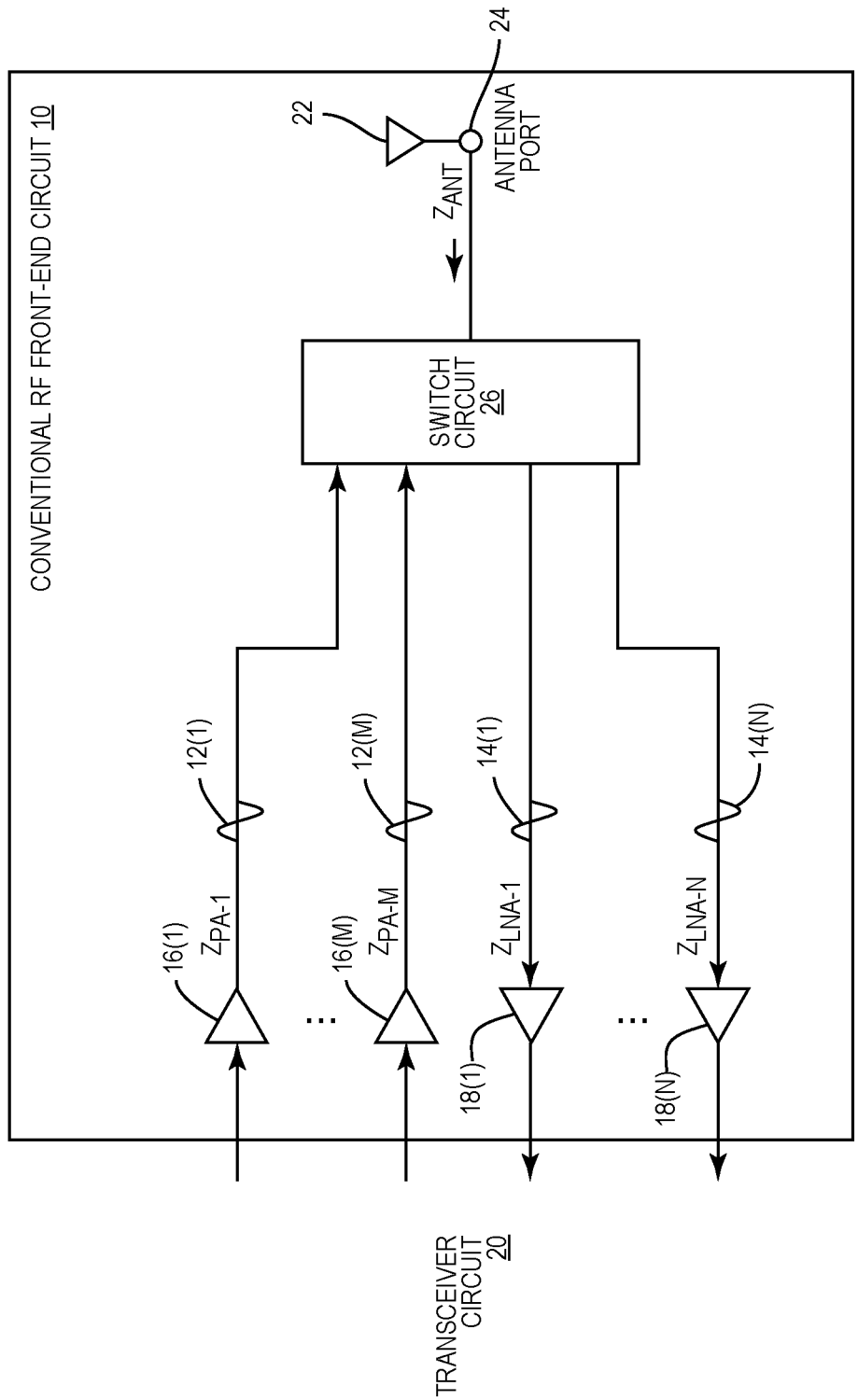
FIG. 1 is a schematic diagram of an exemplary conventional radio frequency (RF) front-end circuit configured to transmit one or more RF transmit signals and receive one or more RF receive signals.

According to previous discussions in FIG. 1, the antenna circuit 32 has an inherent impedance that is relatively constant across different RF bands. In contrast, the impedances Z1-Z6 can vary from one RF band to another. As such, to achieve optimal RF performance in, for example, noise figure (NF), linearity, and/or efficiency, it is necessary to match the inherent impedance of the antenna circuit 32 to each of the impedances Z1-Z6 across a wide range of the RF bands. In addition, it is also necessary to provide adequate RF isolations to help improve such RF performance requirements as adjacent channel leakage ratio (ACLR) between RF bands and polarizations. Further, it is desirable to provide such impedance matching and RF isolation without employing the switch circuit 26 in FIG. 1 to help reduce footprint and insertion.

Figure 2B:
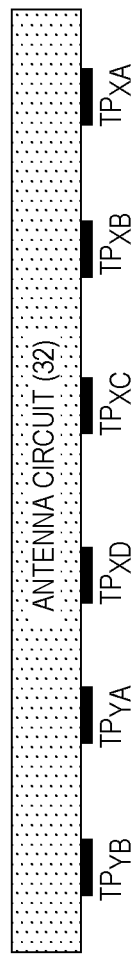
FIG. 2B is a schematic diagram providing an exemplary side-view of an antenna circuit in the multi-band RF front-end circuit of FIG. 2A.

In this regard, in an embodiment, the antenna circuit 32 can be configured to include multiple antenna tap points $TP_{XA}$, $TP_{XB}$, $TP_{XC}$, $TP_{XD}$, $TP_{YA}$, $TP_{YB}$. FIG. 2B is a schematic diagram providing an exemplary side-view of the antenna circuit 32 in FIG. 2A. In a non-limiting example, the tap points $TP_{XA}$, $TP_{XB}$, $TP_{XC}$, $TP_{XD}$, $TP_{YA}$, $TP_{YB}$ are provided underneath the antenna circuit 32.

With reference back to FIG. 2A, each of the antenna tap points $TP_{XA}$, $TP_{XB}$, $TP_{XC}$, $TP_{XD}$, $TP_{YA}$, $TP_{YB}$ is coupled to a respective one of the RF circuits 30(1)-30(6). As illustrated in FIG. 2A, the antenna tap points $TP_{XA}$, $TP_{XB}$, $TP_{XC}$, $TP_{XD}$, $TP_{YA}$, $TP_{YB}$ are so positioned on the antenna circuit 32 to present a respective one of multiple tap impedances $Z_{XA}$, $Z_{XB}$, $Z_{XC}$, $Z_{XD}$, $Z_{YA}$, $Z_{YB}$ that match the respective impedances $TP_{XA}$, $TP_{XB}$, $TP_{XC}$, $TP_{XD}$, $TP_{YA}$, $TP_{YB}$, respectively. In addition, the antenna tap points $TP_{XA}$, $TP_{XB}$, $TP_{XC}$, $TP_{XD}$, $TP_{YA}$, $TP_{YB}$ can also be positioned on the antenna circuit 32 to provide RF isolation between the RF bands and/or polarizations. By providing the antenna tap points $TP_{XA}$, $TP_{XB}$, $TP_{XC}$, $TP_{XD}$, $TP_{YA}$, $TP_{YB}$ in the antenna circuit 32, it is possible to provide impedance matching and RF isolation in the multi-band RF front-end circuit 28 with reduced footprint and insertion loss.

Figure 2C:
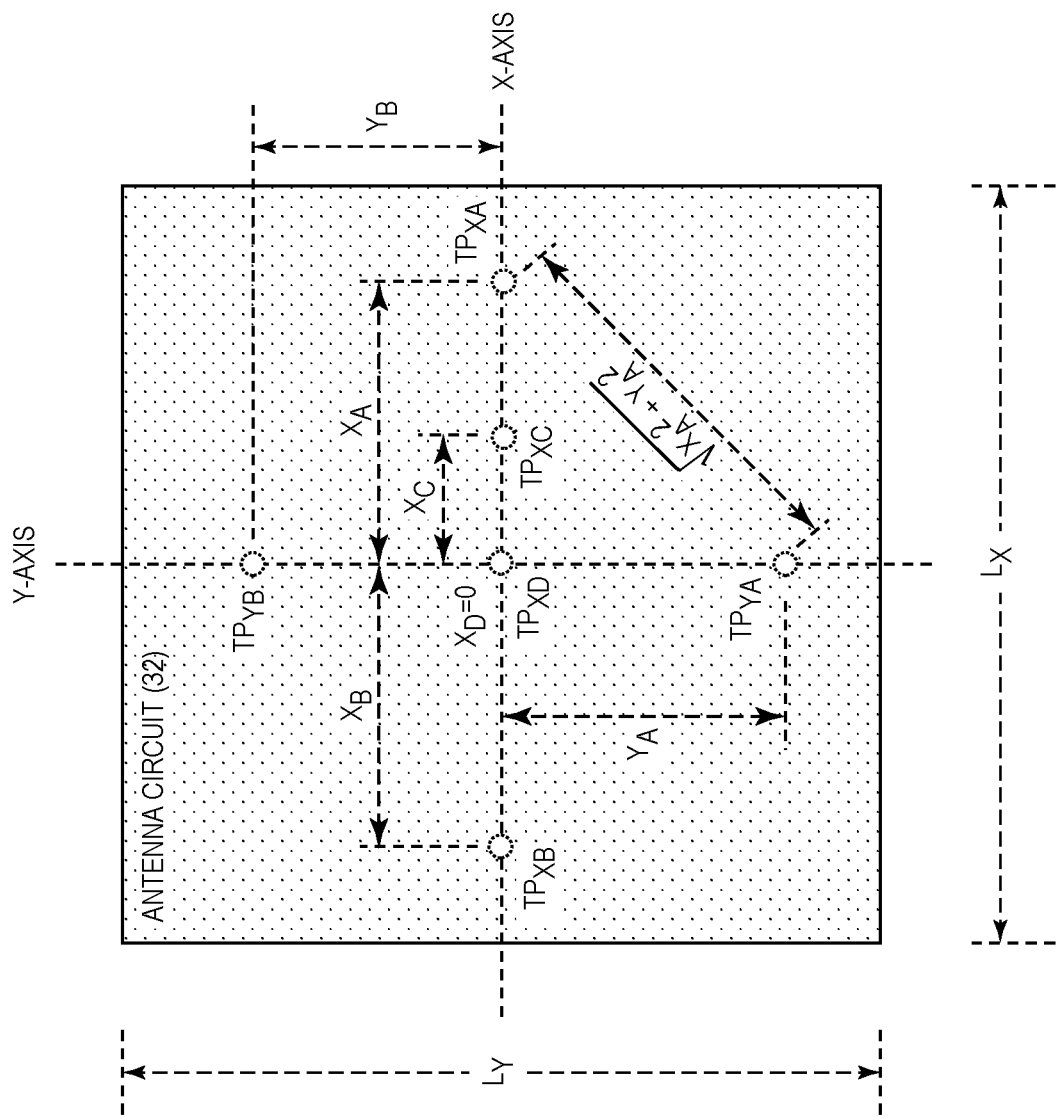
FIG. 2C is a schematic diagram providing an exemplary top-view of the antenna circuit in the multi-band RF front-end circuit of FIG. 2A wherein multiple antenna tap points are positioned on the antenna circuit according to an embodiment of the present disclosure to provide impedance matching and RF isolation in the multi-band RF front-end circuit.

FIG. 2C is a schematic diagram providing an exemplary top-view of the antenna circuit 32 in the multi-band RF front-end circuit 28 of FIG. 2A wherein the antenna tap points $TP_{XA}$, $TP_{XB}$, $TP_{XC}$, $TP_{XD}$, $TP_{YA}$, $TP_{YB}$ are positioned on the antenna circuit 32 according to an embodiment of the present disclosure to provide impedance matching and RF isolation in the multi-band RF front-end circuit 28. Common elements between FIGS. 2A and 2C are shown therein with common element numbers and will not be re-described herein.

As a non-limiting example, the antenna circuit 32 is illustrated herein as a square-shaped antenna (e.g., a patch antenna). In this example, the rectangular-shaped antenna has a width LY measured along a y-axis and a length Lx measured along an x-axis. It should also be appreciated that the tap points $TP_{XA}$, $TP_{XB}$, $TP_{XC}$, $TP_{XD}$, $TP_{YA}$, $TP_{YB}$ are merely examples for the sake of illustration, which do not constitute a limitation as to how many antenna tap points can be provided in the antenna circuit 32.

Herein, the antenna circuit 32 includes an x-axis and a y-axis. In an embodiment, each of the antenna tap points $TP_{XA}$, $TP_{XB}$, $TP_{XC}$, $TP_{XD}$, $TP_{YA}$, $TP_{YB}$ is positioned on either the x-axis or the y-axis. In this regard, each of the antenna tap points $TP_{XA}$, $TP_{XB}$, $TP_{XC}$, $TP_{XD}$, $TP_{YA}$, $TP_{YB}$ will either have a non-zero horizontal distance from the y-axis or a non-zero vertical distance from the x-axis. As an example, each of the antenna tap points $TP_{XA}$, $TP_{XB}$, $TP_{XC}$, $TP_{XD}$ is positioned on the x-axis and each has a respective horizontal distance $X_A$, $X_B$, $X_C$, $X_D$ from the y-axis. In contrast, each of the antenna tap points $TP_{YA}$, $TP_{YB}$ is positioned on the y-axis and each has a respective vertical distance YA, YB from the x-axis. As such, each of the tap impedances $Z_{XA}$, $Z_{XB}$, $Z_{XC}$, $Z_{XD}$, $Z_{YA}$, $Z_{YB}$ can be generated as a function of the non-zero horizontal distance or the vertical distance of a respective one of the antenna tap points $TP_{XA}$, $TP_{XB}$, $TP_{XC}$, $TP_{XD}$, $TP_{YA}$, $TP_{YB}$.

In a non-limiting example, each of the horizontal distances $X_A$, $X_B$, $X_D$ can be normalized as a normalized horizontal distance $NL_{Xi}$ (i=A, B, C, D, ... ), and each of the vertical distances YA, YB can be normalized as a normalized vertical distance $NL_{Yj}$ (j=A, B, ... ) in accordance with the equations below.

$$NL_{Xi} = 2X_i/L_Y \quad (i = A, B, C, D, ...)$$

$$NL_{Yj} = 2Y_j/L_X \quad (j = A, B, ...)$$

Accordingly, the tap impedances $Z_{XA}$, $Z_{XB}$, $Z_{XC}$, $Z_{XD}$, $Z_{YA}$, $Z_{YB}$ can each be derived as a function of the normalized horizontal distance $NL_{Xi}$ or the normalized vertical distance $NL_{Yj}$, as shown in the table (Table 1) below.

TABLE 1

| Normalized Distance ($NL_{Xi}/NL_{Yj}$) | Drive Impedance ($Z_{Xi}/X_{Yj}$) |
|---|---|
| 0.00 | 144 Ω |
| 0.25 | 123 Ω |
| 0.35 | 105 Ω |
| 0.50 | 72 Ω |
| 0.67 | 35 Ω |
| 1.00 | 0 Ω |

Thus, by properly positioning the antenna tap points $TP_{XA}$, $TP_{XB}$, $TP_{XC}$, $TP_{XC}$, $TP_{YA}$, $TP_{YB}$ on the antenna circuit 32, it is possible to create the tap impedances $Z_{XA}$, $Z_{XB}$, $Z_{XC}$, $Z_{XD}$, $Z_{YA}$, $Z_{YB}$ that match respectively the impedances Z1-Z6 of the RF circuits 30(1)-30(6) in the multi-band RF front-end circuit 28 of FIG. 2A.

In an embodiment, the respective horizontal distances $X_A$, $X_B$, $X_C$, $X_D$ of the antenna tap points $TP_{XA}$, $TP_{XB}$, $TP_{XC}$, $TP_{XC}$ and the respective vertical distances YA, YB of the antenna ports $TP_{YA}$, $TP_{YB}$ can be further explored to provide RF isolations among the RF circuits 30(1)-30(6). Specifically, the RF isolations among the RF circuits 30(1)-30(6) can correspond to a relative distance and/or a relative orientation between the antenna tap points $TP_{XA}$, $TP_{XB}$, $TP_{XC}$, $TP_{XD}$, $TP_{YA}$, $TP_{YB}$.

For example, the antenna tap points $TP_{XA}$, $TP_{XB}$ are physically separated by a relative distance of $X_A+X_B$, the antenna tap points $TP_{XA}$, $TP_{XC}$ are physically separated by a relative distance of $X_A-X_C$, and the antenna tap points $TP_{XB}$, $TP_{XC}$ are physically separated by a relative distance of $X_B+X_C$. As illustrated in FIG. 2C, the relative distance of $X_A+X_B$ is greater than the relative distance of $X_B+X_C$, and the relative distance of $X_B+X_C$ is greater than the relative distance of $X_A-X_C$ ($X_A+X_B>X_B+X_C>X_A-X_C$).

Understandably, an RF isolation that can be achieved between any pair of the antenna tap points $TP_{XA}$, $TP_{XB}$, $TP_{XC}$, $TP_{XD}$, $TP_{YA}$, $TP_{YB}$ may depend on a variety of factors, including but not limited to impedance seen, antenna radiation, and physical isolation. In this regard, the antenna tap points $TP_{XA}$, $TP_{XB}$, $TP_{XC}$, $TP_{XD}$ are inherently isolated from antenna tap points $TP_{YA}$, $TP_{YB}$ due to different polarization being excited for the antenna circuit 32. Thus, by properly positioning the antenna tap points $TP_{XA}$, $TP_{XB}$, $TP_{XC}$, $TP_{XD}$, $TP_{YA}$, $TP_{YB}$ on the antenna circuit 32, it is possible to provide more favorable impedance to thereby reduce matching network complexity and switching. Moreover, the RF isolation that can be achieved between any pair of the antenna tap points $TP_{XA}$, $TP_{XB}$, $TP_{XC}$, $TP_{XD}$, $TP_{YA}$, $TP_{YB}$ may be frequency dependent. In this regard, it may be desirable to determine a placement for each of the antenna tap points $TP_{XA}$, $TP_{XB}$, $TP_{XC}$, $TP_{XD}$, $TP_{YA}$, $TP_{YB}$ on a per-frequency basis. As a first general rule, the relative distance between a pair of antenna tap points can result in a favorable RF isolation between a pair of RF circuits coupled to the pair of antenna tap points.

Since the antenna tap points $TP_{XA}$, $TP_{XB}$, $TP_{XC}$, $TP_{XD}$ are all positioned on the x-axis, it is said that the antenna tap points $TP_{XA}$, $TP_{XB}$, $TP_{XC}$, $TP_{XD}$ are linearly oriented with respect to the x-axis. Similarly, as the antenna tap points $TP_{YA}$, $TP_{YB}$ are all positioned on the y-axis, it is said that the antenna tap points $TP_{YA}$, $TP_{YB}$ are linearly oriented with respect to the y-axis. As a second general rule, the linearly oriented antenna tap points are configured to provide RF isolation between different RF bands, but in an identical polarization. In a non-limiting example, the antenna tap points $TP_{XA}$, $TP_{XB}$, $TP_{XC}$, $TP_{XD}$, which are linearly oriented with respect to the x-axis, can be configured to provide RF isolations between different RF bands in a horizontal polarization. In contrast, the antenna tap points $TP_{YA}$, $TP_{YB}$, which are linearly oriented with respect to the y-axis, can be configured to provide RF isolations between different RF bands in a vertical polarization.

The antenna tap points $TP_{XA}$, $TP_{XB}$, $TP_{XC}$, $TP_{XD}$, which are positioned on the x-axis, are said to be orthogonally oriented relative to the antenna tap points $TP_{YA}$, $TP_{YB}$ that are positioned on the y-axis. As a third general rule, the orthogonally oriented antenna tap points can be explored to provide RF isolations between RF signals in an identical RF band but different polarizations. For example, the antenna tap points $TP_{XA}$, $TP_{YA}$ can provide RF isolation between RF signals received or transmitted in a single RF band but two different polarizations (e.g., horizontal and vertical polarizations). In an embodiment, the RF isolation that can be provided between the antenna tap points $TP_{XA}$, $TP_{XB}$ can correspond to a relative distance $\sqrt{X_A^2+Y_A^2}$ between the antenna tap points $TP_{XA}$, $TP_{XB}$.

Figure 2D:
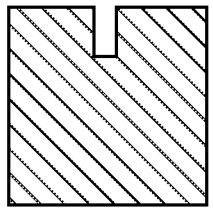
FIG. 2D is a schematic diagram providing an exemplary illustration of various geometric shapes of the antenna circuit in FIGS. 2B and 2C.
Figure 2D:
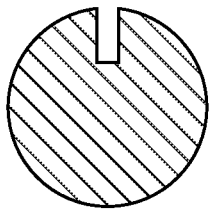
Figure 2D:
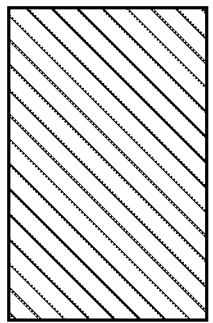
Figure 2D:
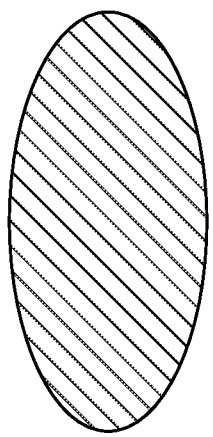
Figure 2D:
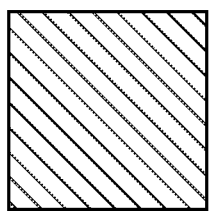
Figure 2D:
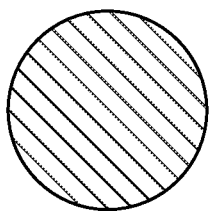
Figure 2E:
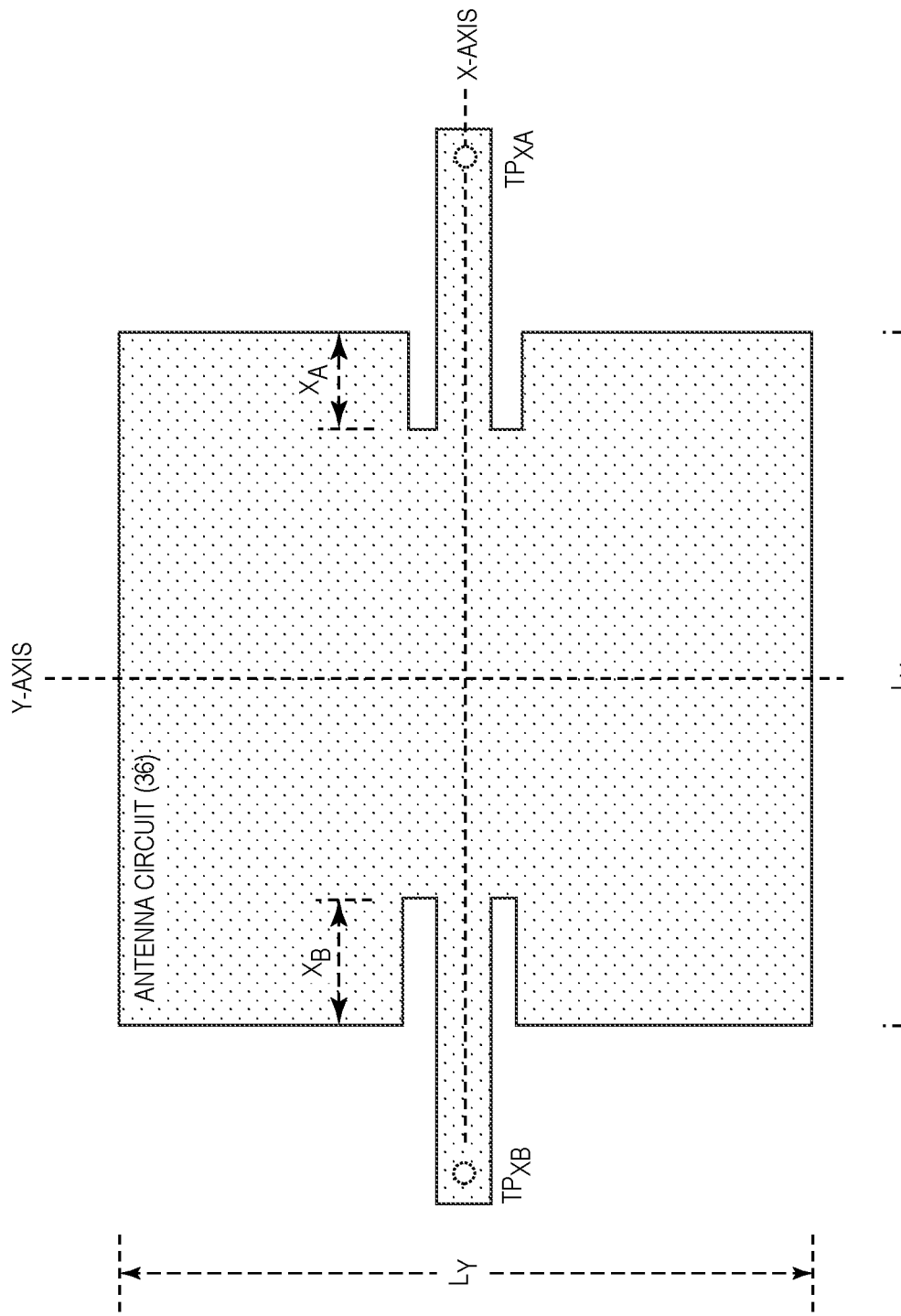
FIG. 2E is a schematic diagram of an exemplary top-view of an antenna circuit provided in a different geometric shape from the antenna circuit in FIG. 2C.

The antenna circuit 32 can be provided in a variety of geometric shapes, as shown in FIG. 2D as non-limiting examples. FIG. 2E is a schematic diagram of an exemplary top-view of an antenna circuit 36 provided in a different geometric shape from the antenna circuit 32 in FIG. 2C.

As shown in FIG. 2E, the antenna circuit 36 includes a pair of antenna tap points $TP_{XA}$, $TP_{XB}$. The antenna tap point $TP_{XA}$ has an inset depth $X_A$ and the antenna tap point $TP_{XB}$ has an inset depth $X_B$. The inset depths $X_A$, $X_B$ can each be normalized as a normalized inset depth $NL_{Xi}$ (i=A, B, ... ) in accordance with the equations below.

$$NL_{Xi}=2X_i/L_y (i=A,B,...)$$

Accordingly, a pair of tap impedances $Z_{Xi}$ (i=A, B, ... ) can be derived as a function of the normalized inset depth $NL_{Xi}$, as shown in the table (Table 2) below.

TABLE 2

| Normalized Distance ($NL_{Xi}$) | Drive Impedance ($Z_{Xi}$) |
|---|---|
| 0.00 | 167 Ω |
| 0.25 | 108 Ω |
| 0.35 | 91.5 Ω |

TABLE 2-continued

| Normalized Distance ($NL_{Xi}$) | Drive Impedance ($Z_{Xi}$) |
| --- | --- |
| 0.50 | 41 Ω |
| 0.67 | 13.5 Ω |
| 1.00 | 19 Ω |

Like the antenna circuit 32, the antenna tap points $TP_{X4}$, $TP_{XB}$ in the antenna circuit 36 can also provide impedance matching and RF isolation in accordance with the general rules described above.

Figure 3A:
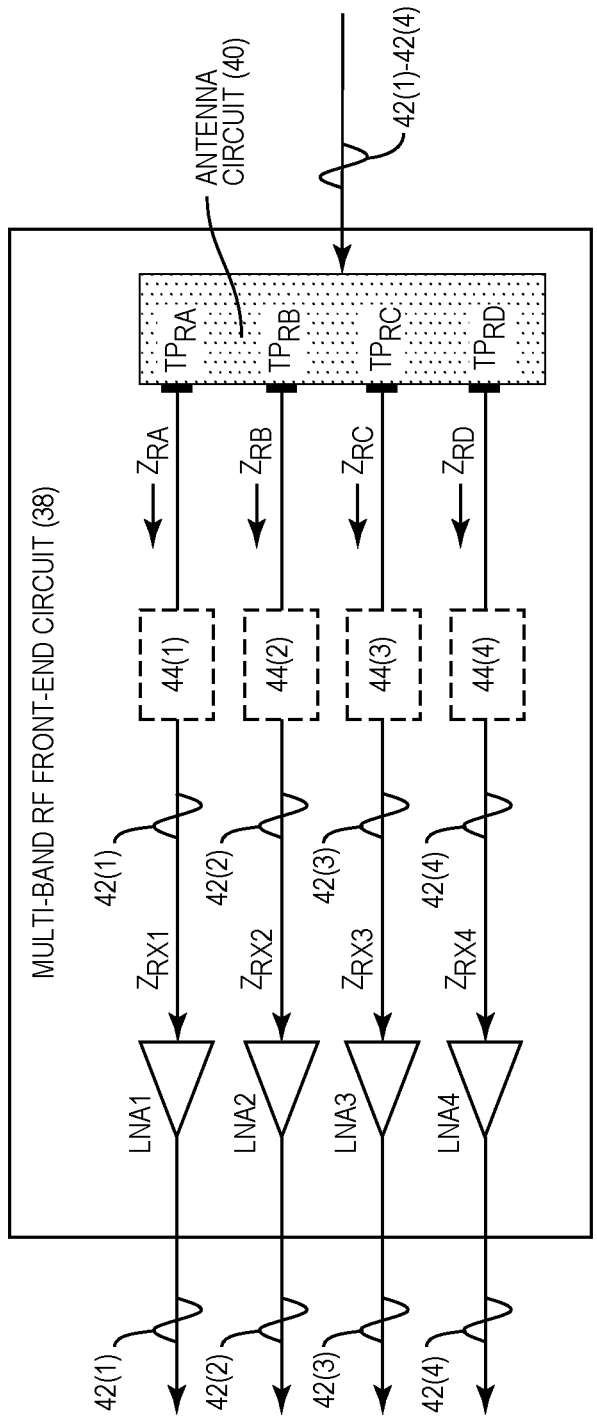
FIG. 3A is a schematic diagram of an exemplary multi-band RF front-end circuit wherein multiple receive tap points are positioned in an antenna circuit to provide impedance matching and RF isolation among multiple low-noise amplifier (LNA) circuits.

In an embodiment, the RF circuits 30(1)-30(6) in the multi-band RF front-end circuit 28 of FIG. 2A can each be an LNA circuit. In this regard, FIG. 3A is a schematic diagram of an exemplary multi-band RF front-end circuit 38 wherein multiple receive tap points $TP_{RA}$, $TP_{RB}$, $TP_{RC}$, $TP_{RD}$ are provided in an antenna circuit 40 to provide impedance matching and RF isolation among multiple LNA circuits LNA1, LNA2, LNA3, LNA4. Notably, the LNA circuits LNA1, LNA2, LNA3, LNA4 and the receive tap points $TP_{RA}$, $TP_{RB}$, $TP_{RC}$, $TP_{RD}$ are merely provided herein for the purpose of reference and illustration. It should by no means be considered as limitations of any sort. It should be appreciated that the multi-band RF front-end circuit 38 can include any number of LNA circuits as appropriate and, accordingly, the antenna circuit 40 can include an equal number of receive tap points.

Each of the LNA circuits LNA1, LNA2, LNA3, LNA4 has a respective one of multiple noise impedances $Z_{RX1}$, $Z_{RX2}$, $Z_{RX3}$, $Z_{RX4}$ and each is configured to amplify a respective one of multiple RF receive signals 42(1)-42(4). In this regard, to ensure that the LNA circuits LNA1, LNA2, LNA3, LNA4 can each operate with an optimal NF, it is necessary for the receive tap points $TP_{RA}$, $TP_{RB}$, $TP_{RC}$, $TP_{RD}$ to present multiple receive drive impedances $Z_{RA}$, $Z_{RB}$, $Z_{RC}$, $Z_{RD}$ that match the noise impedances $Z_{RX1}$, $Z_{RX2}$, $Z_{RX3}$, $Z_{RX4}$, respectively. Further, to achieve optimal ACLR between the RF receive signals 42(1)-42(4), the receive tap points $TP_{RA}$, $TP_{RB}$, $TP_{RC}$, $TP_{RD}$ must also provide sufficient RF isolations between the LNA circuits LNA1, LNA2, LNA3, LNA4 and/or the RF receive signals 42(1)-42(4). Herein, the LNA circuits LNA1, LNA2, LNA3, LNA4 are considered to be related based on the assumption that the RF receive signals 42(1)-42(4) are received in respective RF receive bands that are susceptible to inter-frequency interference. Accordingly, the receive tap points $TP_{RA}$, $TP_{RB}$, $TP_{RC}$, $TP_{RD}$ are also considered to be related because the receive tap points $TP_{RA}$, $TP_{RB}$, $TP_{RC}$, $TP_{RD}$ are coupled to the related LNA circuits LNA1, LNA2, LNA3, LNA4.

Figure 3B:
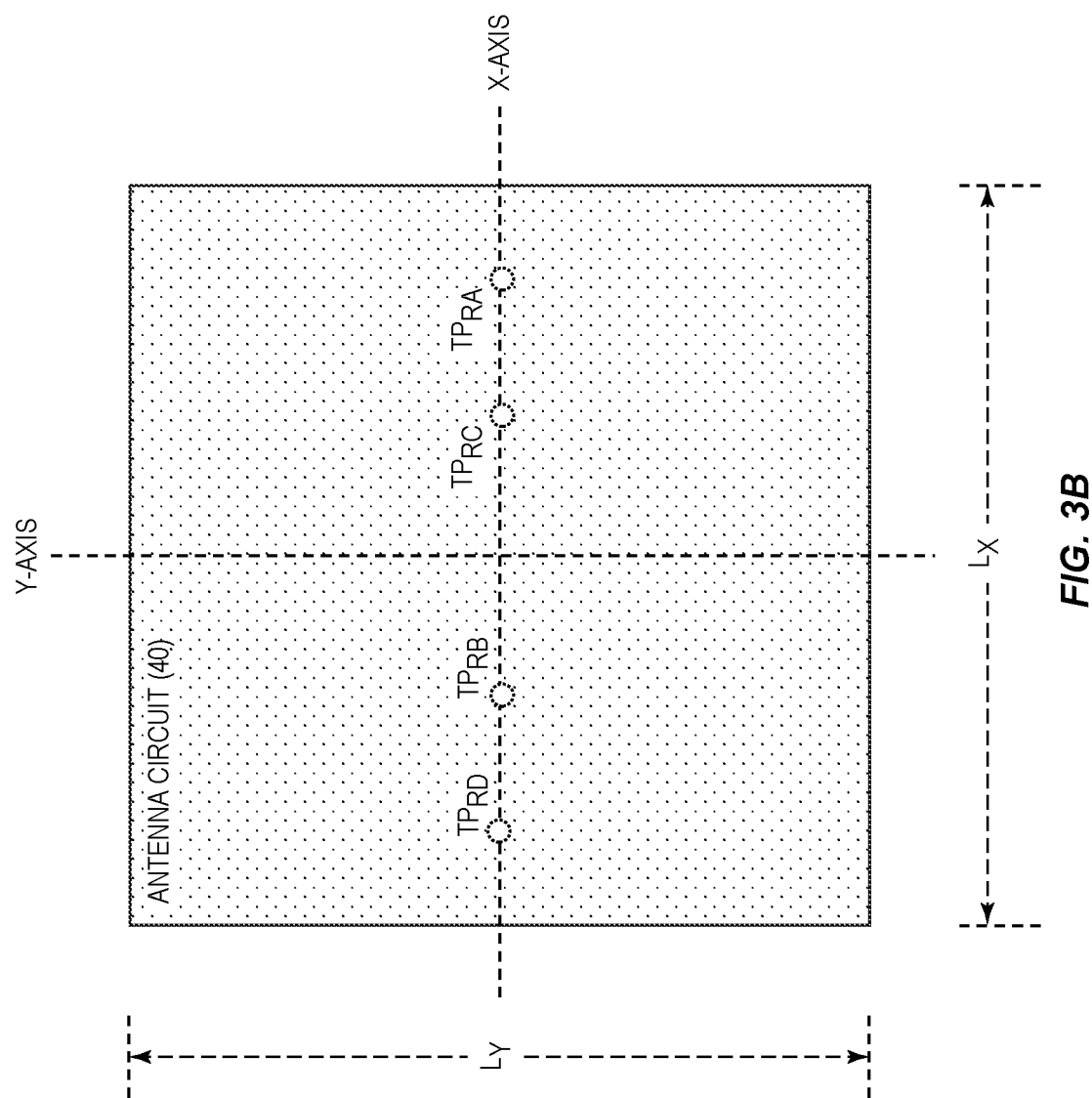
FIG. 3B is a schematic diagram illustrating an exemplary arrangement of the receive tap points in FIG. 3A for providing RF isolations among multiple RF receive signals that are received in a same receive polarization but different RF receive bands.

In one embodiment, the LNA circuits LNA1, LNA2, LNA3, LNA4 are configured to amplify the RF receive signals 42(1)-42(4) that are received in a same receive polarization (horizontal or vertical polarization) but different RF receive bands. In this regard, FIG. 3B is a schematic diagram illustrating an exemplary arrangement of the receive tap points $TP_{RA}$, $TP_{RB}$, $TP_{RC}$, $TP_{RD}$ in FIG. 3A for providing RF isolations among the RF receive signals 42(1)-42(4) that are received in a same receive polarization but different RF receive bands. Common elements between FIGS. 3A and 3B are shown therein with common element numbers and will not be re-described herein.

According to previous discussions in FIG. 2C, the receive tap points $TP_{RA}$, $TP_{RB}$, $TP_{RC}$, $TP_{RD}$ can be linearly oriented on the x-axis or the y-axis when the RF receive signals 42(1)-42(N) are received in the same receive polarization. In this regard, in the example shown in FIG. 3B, the receive tap points $TP_{RA}$, $TP_{RB}$, $TP_{RC}$, $TP_{RD}$ are linearly aligned on the x-axis if the RF receive signals 42(1)-42(4) are received in a horizontal polarization. Understandably, the receive tap points $TP_{RA}$, $TP_{RB}$, $TP_{RC}$, $TP_{RD}$ can also be linearly aligned on the y-axis if the RF receive signals 42(1)-42(4) are received in a vertical polarization.

Figure 3C:
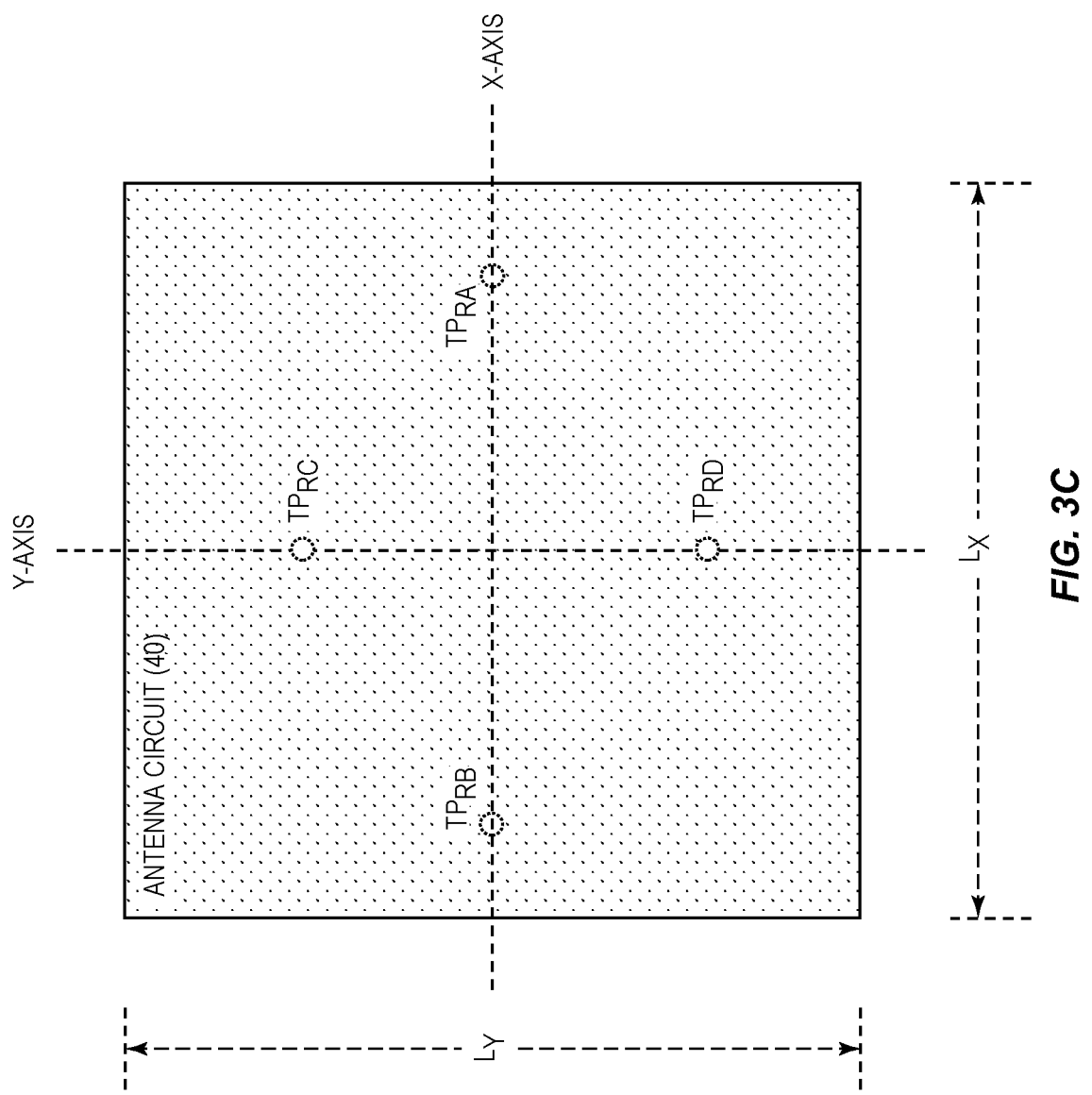
FIG. 3C is a schematic diagram illustrating an exemplary arrangement of the receive tap points in FIG. 3A for providing RF isolations among multiple RF receive signals that are received in different receive polarizations and different RF receive bands.

In another embodiment, the LNA circuits LNA1, LNA2, LNA3, LNA4 are configured to amplify the RF receive signals 42(1)-42(4) that are received in different receive polarizations (horizontal and vertical polarizations) as well as different RF receive bands. In this regard, FIG. 3C is a schematic diagram illustrating an exemplary arrangement of the receive tap points $TP_{RA}$, $TP_{RB}$, $TP_{RC}$, $TP_{RD}$ in FIG. 3A for providing RF isolations among the RF receive signals 42(1)-42(4) that are received in different receive polarizations as well as different RF receive bands. Common elements between FIGS. 3A and 3C are shown therein with common element numbers and will not be re-described herein.

According to previous discussions in FIG. 2C, the receive tap points $TP_{RA}$, $TP_{RB}$, $TP_{RC}$, $TP_{RD}$ can be orthogonally oriented on the x-axis and the y-axis when the RF receive signals 42(1)-42(N) are received in the different receive polarizations. In this regard, in the example shown in FIG. 3C, the receive tap points $TP_{RA}$, $TP_{RB}$ are linearly aligned on the x-axis, while the receive tap points $TP_{RC}$, $TP_{RD}$ are linearly aligned on the y-axis. Accordingly, the receive tap points $TP_{RA}$, $TP_{RB}$ are orthogonally oriented with respect to the receive tap points $TP_{RC}$, $TP_{RD}$.

In a non-limiting example, the receive tap points $TP_{RA}$, $TP_{RB}$ are positioned to provide RF isolation between RF receive signals 42(1), 42(2), which can be received in a horizontal receive polarization, but different RF receive bands. In contrast, the receive tap points $TP_{RC}$, $TP_{RD}$ are positioned to provide RF isolation between RF receive signals 42(3), 42(4), which can be received in a vertical receive polarization, but different RF receive bands.

With reference back to FIG. 3A, the multi-band RF front-end circuit 38 may include multiple receive coupling circuits 44(1)-44(4). Each of the receive coupling circuits 44(1)-44(4) is coupled between a respective one of the LNA circuits LNA1, LNA2, LNA3, LNA4 and a respective one of the receive tap points $TP_{RA}$, $TP_{RB}$, $TP_{RC}$, $TP_{RD}$. In an embodiment, each of the receive coupling circuits 44(1)-44(4) can be configured to present a respective one of the noise impedances $Z_{RX1}$, $Z_{RX2}$, $Z_{RX3}$, $Z_{RX4}$ to the respective one of the receive tap points $TP_{RA}$, $TP_{RB}$, $TP_{RC}$, $TP_{RD}$ when the respective one of the LNA circuits LNA1, LNA2, LNA3, LNA4 is deactivated. For example, when the LNA circuit LNA1 is deactivated, the receive coupling circuit 44(1) will present the respective noise impedance $Z_{RX1}$ to the receive tap point $TP_{RA}$.

Figure 4A:
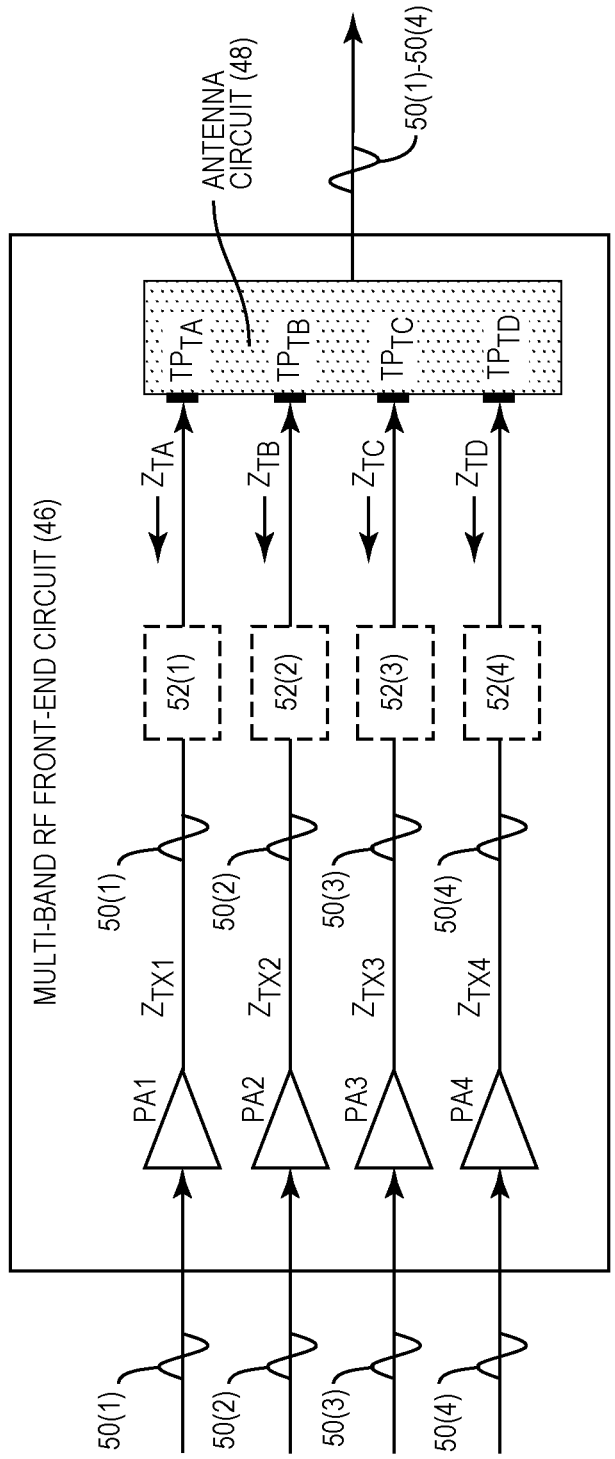
FIG. 4A is a schematic diagram of an exemplary multi-band RF front-end circuit wherein multiple transmit tap points are positioned in an antenna circuit to provide impedance matching and RF isolation among multiple power amplifier (PA) circuits.

In another embodiment, the RF circuits 30(1)-30(6) in the multi-band RF front-end circuit 28 of FIG. 2A can each be a PA circuit. In this regard, FIG. 4A is a schematic diagram of an exemplary multi-band RF front-end circuit 46 wherein multiple transmit tap points $TP_{TA}$, $TP_{TB}$, $TP_{TC}$, $TP_{TD}$ are provided in an antenna circuit 48 to provide impedance matching and RF isolation among multiple PA circuits PA1, PA2, PA3, PA4. Notably, the PA circuits PA1, PA2, PA3, PA4 and the transmit tap points $TP_{TA}$, $TP_{TB}$, $TP_{TC}$, $TP_{TD}$ are merely provided herein for the purpose of reference and illustration. It should by no means be considered as limitations of any sort. It should be appreciated that the multi-band RF front-end circuit 46 can include any number of PA circuits as appropriate and, accordingly, the antenna circuit 48 can include an equal number of transmit tap points.

Each of the PA circuits PA1, PA2, PA3, PA4 has a respective one of multiple load impedances $Z_{TX1}$, $Z_{TX2}$, $Z_{TX3}$, $Z_{TX4}$ and each is configured to amplify a respective one of multiple RF transmit signals 50(1)-50(4). In this regard, to ensure that the PA circuits PA1, PA2, PA3, PA4 can each operate with an optimal linearity and/or efficiency, it is necessary for the transmit tap points $TP_{TA}$, $TP_{TB}$, $TP_{TC}$, $TP_{TD}$ to present multiple transmit drive impedances $Z_{TA}$, $Z_{TB}$, $Z_{TC}$, $Z_{TD}$ that match the load impedances $Z_{TX1}$, $Z_{TX2}$, $Z_{TX3}$, $Z_{TX4}$, respectively. Further, to achieve optimal ACLR between the RF transmit signals 50(1)-50(4), the transmit tap points $TP_{TA}$, $TP_{TB}$, $TP_{TC}$, $TP_{TD}$ must also provide sufficient RF isolations between the PA circuits PA1, PA2, PA3, PA4 and/or the RF transmit signals 50(1)-50(4). Herein, the PA circuits PA1, PA2, PA3, PA4 are considered to be related based on the assumption that the RF transmit signals 50(1)-50(4) are to be transmitted in respective RF transmit bands that are susceptible to inter-frequency interference. Accordingly, the transmit tap points $TP_{TA}$, $TP_{TB}$, $TP_{TC}$, $TP_{TD}$ are also considered to be related because the transmit tap points $TP_{TA}$, $TP_{TB}$, $TP_{TC}$, $TP_{TD}$ are coupled to the related PA circuits PA1, PA2, PA3, PA4.

Figure 4B:
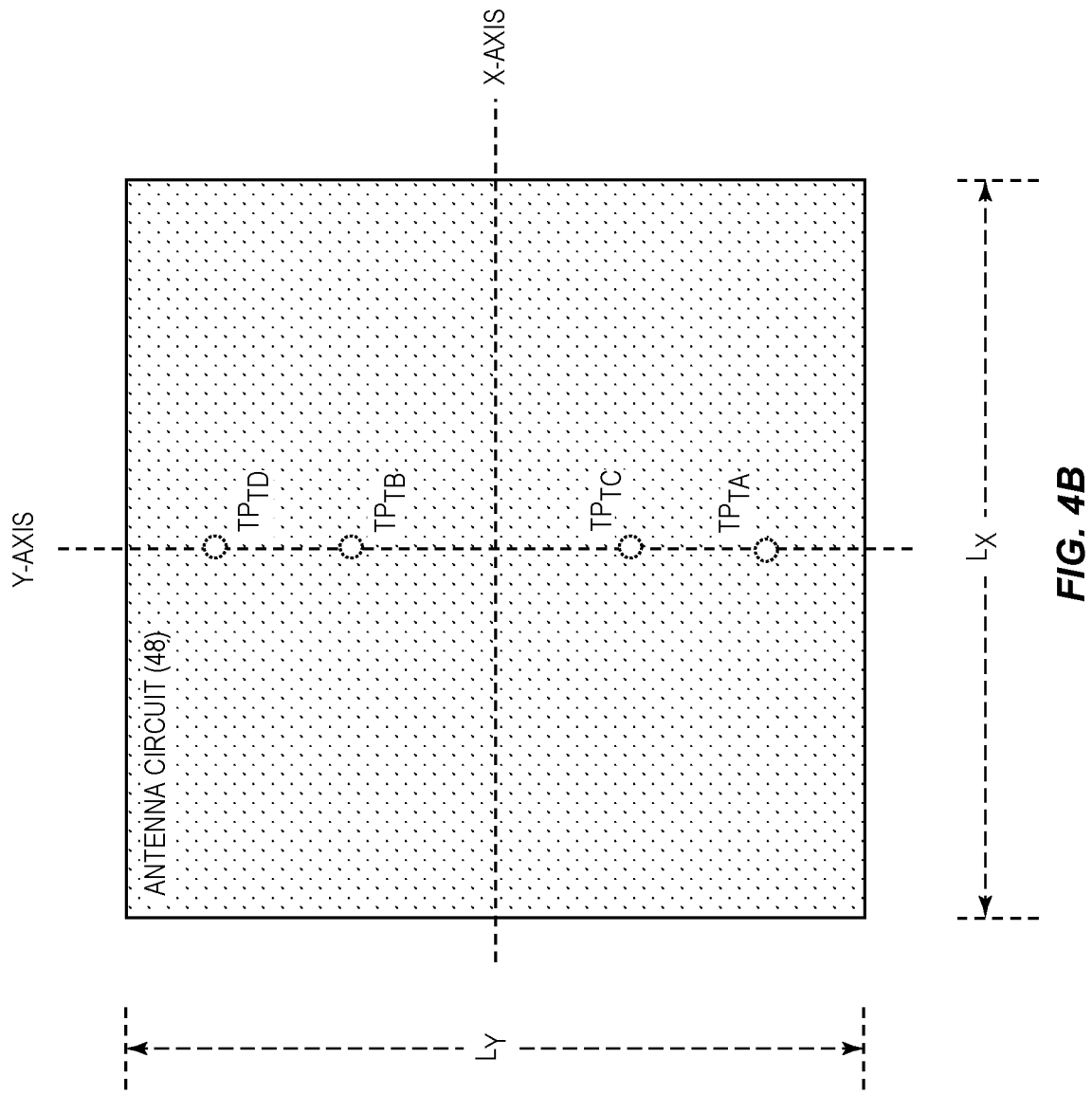
FIG. 4B is a schematic diagram illustrating an exemplary arrangement of the transmit tap points in FIG. 4A for providing RF isolations among multiple RF transmit signals for transmission in a same transmit polarization but different RF transmit bands.

In one embodiment, the PA circuits PA1, PA2, PA3, PA4 are configured to amplify the RF transmit signals 50(1)-50(4) for transmission in a same transmit polarization (horizontal or vertical polarization) but different RF transmit bands. In this regard, FIG. 4B is a schematic diagram illustrating an exemplary arrangement of the transmit tap points $TP_{TA}$, $TP_{TB}$, $TP_{TC}$, $TP_{TD}$ in FIG. 4A for providing RF isolations among the RF transmit signals 50(1)-50(4) for transmission in a same transmit polarization but different RF transmit bands. Common elements between FIGS. 4A and 4B are shown therein with common element numbers and will not be re-described herein.

According to previous discussions in FIG. 2C, the transmit tap points $TP_{TA}$, $TP_{TB}$, $TP_{TC}$, $TP_{TD}$ can be linearly oriented on the x-axis or the y-axis when the RF transmit signals 50(1)-50(N) are transmitted in the same transmit polarization. In this regard, in the example shown in FIG. 4B, the transmit tap points $TP_{TA}$, $TP_{TB}$, $TP_{TC}$, $TP_{TD}$ are linearly aligned on the x-axis if the RF transmit signals 50(1)-50(4) are transmitted in a horizontal polarization. Understandably, the transmit tap points $TP_{TA}$, $TP_{TB}$, $TP_{TC}$, $TP_{TD}$ can also be linearly aligned on the y-axis if the RF transmit signals 50(1)-50(4) are transmitted in a vertical polarization.

Figure 4C:
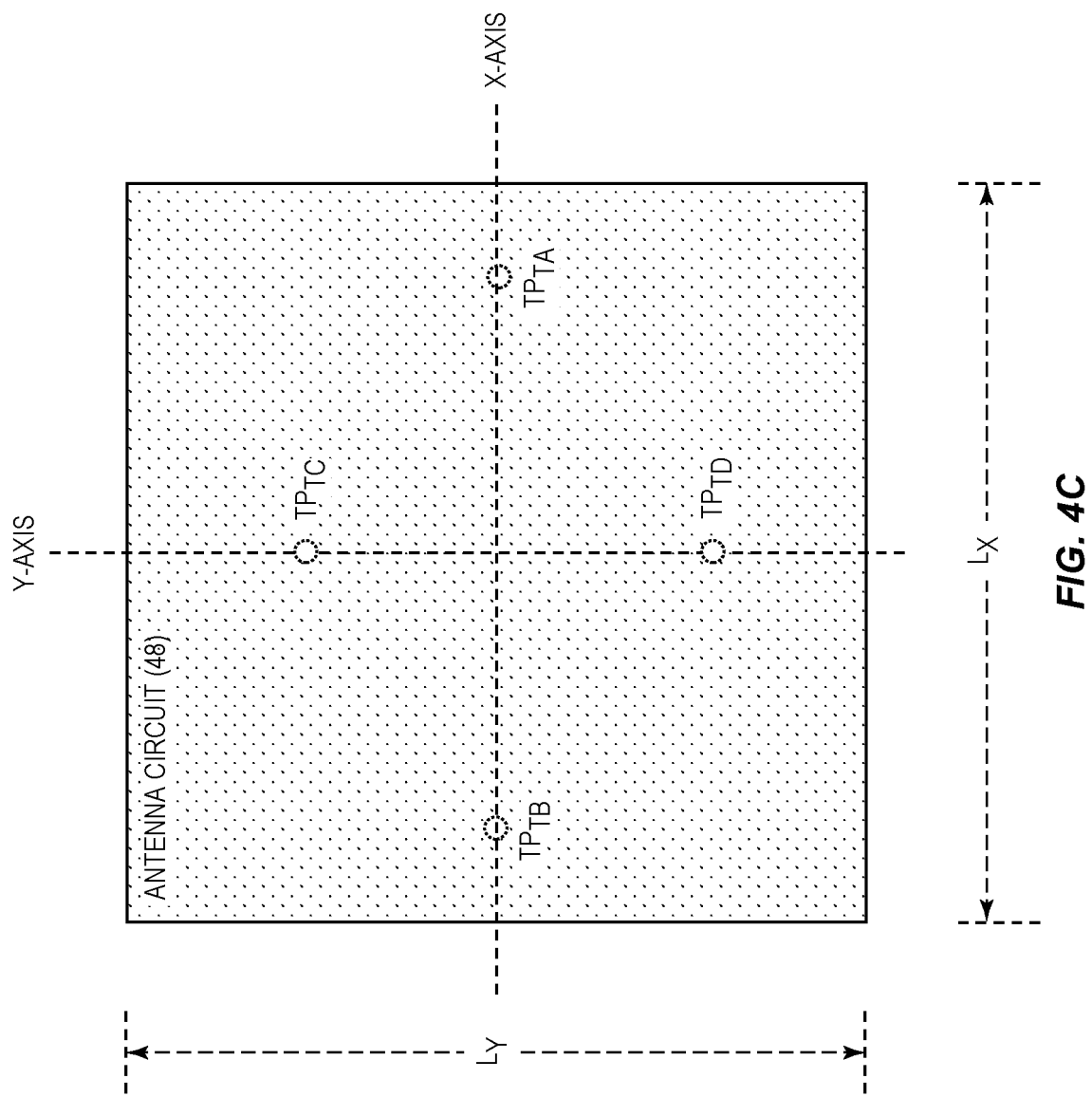
FIG. 4C is a schematic diagram illustrating an exemplary arrangement of the transmit tap points in FIG. 4A for providing RF isolations among multiple RF transmit signals for transmission in different transmit polarizations and different RF transmit bands.

In another embodiment, the PA circuits PA1, PA2, PA3, PA4 are configured to amplify the RF transmit signals 50(1)-50(4) for transmission in different transmit polarizations (horizontal and vertical polarizations) as well as different RF transmit bands. In this regard, FIG. 4C is a schematic diagram illustrating an exemplary arrangement of the transmit tap points $TP_{TA}$, $TP_{TB}$, $TP_{TC}$, $TP_{TD}$ in FIG. 4A for providing RF isolations among the RF transmit signals 50(1)-50(4) for transmission in different transmit polarizations as well as different RF transmit bands. Common elements between FIGS. 4A and 4C are shown therein with common element numbers and will not be re-described herein.

According to previous discussions in FIG. 2C, the transmit tap points $TP_{TA}$, $TP_{TB}$, $TP_{TC}$, $TP_{TD}$ can be orthogonally oriented on the x-axis and the y-axis when the RF transmit signals 50(1)-50(N) are transmitted in the different transmit polarizations. In this regard, in the example shown in FIG. 4C, the transmit tap points $TP_{TA}$, $TP_{TB}$ are linearly aligned on the x-axis, while the transmit tap points $TP_{TC}$, $TP_{TD}$ are linearly aligned on the y-axis. Accordingly, the transmit tap points $TP_{TA}$, $TP_{TB}$ are orthogonally oriented with respect to the transmit tap points $TP_{TC}$, $TP_{TD}$.

In a non-limiting example, the transmit tap points $TP_{TA}$, $TP_{TB}$ are positioned to provide RF isolation between RF receive signals 42(1), 42(2), which can be transmitted in a horizontal transmit polarization, but different RF transmit bands. In contrast, the transmit tap points $TP_{TC}$, $TP_{TD}$ are positioned to provide RF isolation between RF transmit signals 50(3), 50(4), which can be transmitted in a vertical transmit polarization, but different RF transmit bands.

With reference back to FIG. 4A, the multi-band RF front-end circuit 46 may include multiple transmit coupling circuits 52(1)-52(4). Each of the transmit coupling circuits 52(1)-52(4) is coupled between a respective one of the PA circuits PA1, PA2, PA3, PA4 and a respective one of the transmit tap points $TP_{TA}$, $TP_{TB}$, $TP_{TC}$, $TP_{TD}$. In an embodiment, each of the transmit coupling circuits 52(1)-52(4) can be configured to present a respective one of the load impedances $Z_{TX1}$, $Z_{TX2}$, $Z_{TX3}$, $Z_{TX4}$ to the respective one of the transmit tap points $TP_{TA}$, $TP_{TB}$, $TP_{TC}$, $TP_{TD}$ when the respective one of the PA circuits PA1, PA2, PA3, PA4 is deactivated. For example, when the PA circuit PA1 is deactivated, the transmit coupling circuit 52(1) will present the respective load impedance $Z_{TX1}$ to the transmit tap point $TP_{TA}$.

In another embodiment, the RF circuits 30(1)-30(6) in the multi-band RF front-end circuit 28 of FIG. 2A can include both LNA and PA circuits. In this regard, FIG. 5A is a schematic diagram of an exemplary multi-band RF front-end circuit 54 wherein multiple receive tap points $TP_{RA}$, $TP_{RB}$, $TP_{RC}$, $TP_{RD}$ and multiple transmit tap points $TP_{TA}$, $TP_{TB}$, $TP_{TC}$, $TP_{TD}$ are provided in an antenna circuit 56 to provide impedance matching and RF isolation among multiple LNA circuits LNA1, LNA2, LNA3, LNA4 and multiple PA circuits PA1, PA2, PA3, PA4. Common elements between FIGS. 3A, 4A, and 5A are shown therein with common element numbers and will not be re-described herein.

FIG. 5B is a schematic diagram illustrating an exemplary arrangement of the receive tap points $TP_{RA}$, $TP_{RB}$, $TP_{RC}$, $TP_{RD}$ and the transmit tap points $TP_{TA}$, $TP_{TB}$, $TP_{TC}$, $TP_{TD}$ in FIG. 5A for providing RF isolations among the RF receive signals 42(1)-42(4) that are received in a same receive polarization but different RF receive bands and the RF transmit signals 50(1)-50(4) that are transmitted in a same transmit polarization but different RF transmit bands. Common elements between FIGS. 3B, 4B, and 5B are shown therein with common element numbers and will not be re-described herein.

FIG. 5C is a schematic diagram illustrating an exemplary arrangement of the receive tap points $TP_{RA}$, $TP_{RB}$, $TP_{RC}$, $TP_{RD}$ and the transmit tap points $TP_{TA}$, $TP_{TB}$, $TP_{TC}$, $TP_{TD}$ in FIG. 5A for providing RF isolations among the RF receive signals 42(1)-42(4) that are received in different receive polarizations and different RF receive bands and the RF transmit signals 50(1)-50(4) that are transmitted in different transmit polarizations and different RF transmit bands. Common elements between FIGS. 3C, 4C, and 5C are shown therein with common element numbers and will not be re-described herein.

Notably, the antenna circuit 32 in FIG. 2A, the antenna circuit 40 in FIG. 3A, the antenna circuit 48 in FIG. 4A, and the antenna circuit 56 in FIG. 5A are all illustrated as rectangular-shaped antenna circuits. However, as mentioned earlier, it is also possible for the antenna circuit 32, the antenna circuit 40, the antenna circuit 48, and/or the antenna circuit 56 in other geometrical shapes. In this regard, FIG. 6 is a schematic diagram illustrating an exemplary arrangement of the receive tap points $TP_{RA}$, $TP_{RB}$, $TP_{RC}$, $TP_{RD}$ and the transmit tap points $TP_{TA}$, $TP_{TB}$, $TP_{TC}$, $TP_{TD}$ in FIG. 5A in a circular-shaped antenna circuit 58.

In contrast to the arrangements illustrated in FIGS. 5B and 5C, the receive tap points $TP_{RA}$, $TP_{RB}$, $TP_{RC}$, $TP_{RD}$ and the transmit tap points $TP_{TA}$, $TP_{TB}$, $TP_{TC}$, $TP_{TD}$ are not positioned on the x-axis and the y-axis. In this regard, it should be appreciated it is also possible to modify the arrangement in FIGS. 5B and 5C by positioning the receive tap points $TP_{RA}$, $TP_{RB}$, $TP_{RC}$, $TP_{RD}$ and the transmit tap points $TP_{TA}$, $TP_{TB}$, $TP_{TC}$, $TP_{TD}$ off the x-axis and the y-axis.

FIGS. 7A-7C are schematic diagrams providing exemplary illustrations of different coupling circuits 60, 62, 64 that can be provided in the multi-band RF front-end circuit 54 of FIG. 5A as any of the receive coupling circuits 44(1)-44(4) and/or the transmit coupling circuits 52(1)-52(4).

According to FIG. 7A, the coupling circuit 60 includes a capacitor $C_{OFF}$. In an embodiment, when the coupling circuit 60 is provided as any of the receive coupling circuits 44(1)-44(4), the capacitor $C_{OFF}$ can load any of the receive tap points $TP_{RA}$, $TP_{RB}$, $TP_{RC}$, $TP_{RD}$ when any of the LNA circuits LNA1, LNA2, LNA3, LNA4 is deactivated. Similarly, when the coupling circuit 60 is provided as any of the transmit coupling circuits 52(1)-52(4), the capacitor $C_{OFF}$ can load any of the transmit tap points $TP_{TA}$, $TP_{TB}$, $TP_{TC}$, $TP_{TD}$ when any of the PA circuits PA1, PA2, PA3, PA4 is deactivated.

The coupling circuit 60 may include an out-band matching circuit 66. In an embodiment, when the coupling circuit 60 is provided as any of the receive coupling circuits 44(1)-44(4), the out-band matching circuit 66 can reduce out-of-band loading caused by any deactivated one or more of the LNA circuits LNA1, LNA2, LNA3, LNA4 on any active one of the LNA circuits LNA1, LNA2, LNA3, LNA4. For example, when the LNA circuit LNA1 in FIGS. 3A and 5A is deactivated and the LNA circuits LNA2, LNA3, LNA4 remain active, the out-band matching circuit 66 provided in the receive coupling circuit 44(1) can reduce out-of-band loading caused by the LNA circuit LNA1 on any of the LNA circuits LNA2, LNA3, LNA4. In another example, when the LNA circuits LNA1, LNA2, and LNA3 in FIGS. 3A and 5A are deactivated and the LNA circuit LNA4 remains active, the out-band matching circuit 66 provided in the receive coupling circuit 44(1) can reduce out-of-band loading caused by the LNA circuits LNA1, LNA2, LNA3 on the LNA circuit LNA4.

Likewise, when the coupling circuit 60 is provided as any of the transmit coupling circuits 52(1)-52(4), the out-band matching circuit 66 can reduce out-of-band loading caused by any deactivated one or more of the PA circuits PA1, PA2, PA3, PA4 on any active one of the PA circuits PA1, PA2, PA3, PA4. For example, when the PA circuit PA1 in FIGS. 3A and 5A is deactivated and the PA circuits PA2, PA3, PA4 remain active, the out-band matching circuit 66 provided in the transmit coupling circuit 52(1) can reduce out-of-band loading caused by the PA circuit PA1 on any of the PA circuits PA2, PA3, PA4. In another example, when the PA circuits PA1, PA2, and PA3 in FIGS. 3A and 5A are deactivated and the PA circuit PA4 remains active, the out-band matching circuit 66 provided in the transmit coupling circuit 52(1) can reduce out-of-band loading caused by the PA circuits PA1, PA2, and PA3 on the PA circuit PA4.

According to FIG. 7B, the coupling circuit 62 includes a transmission line (TL) 68. In an embodiment, the TL 68 can provide a similar functionality as the capacitor $C_{OFF}$ in the coupling circuit 60.

According to FIG. 7B, the coupling circuit 64 includes a spiraled TL 70. In an embodiment, the spiraled TL 70 can provide a similar functionality as the capacitor $C_{OFF}$ in the coupling circuit 62 and/or the TL 68 in the coupling circuit 62.

Those skilled in the art will recognize improvements and modifications to the preferred embodiments of the present disclosure. All such improvements and modifications are considered within the scope of the concepts disclosed herein and the claims that follow.

What is claimed is:

1. A multi-band radio frequency (RF) front-end circuit comprising:
   a plurality of RF circuits each having a respective impedance; and
   an antenna circuit comprising a plurality of antenna tap points each coupled to a respective one of the plurality of RF circuits and positioned on the antenna circuit to:
      present a respective tap impedance to thereby match the respective impedance of the respective one of the plurality of RF circuits; and
      distance from one or more related antenna tap points among the plurality of antenna tap points to thereby provide a respective RF isolation between the respective one of the plurality of RF circuits and one or more related RF circuits among the plurality of RF circuits that are coupled respectively to the one or more related antenna tap points.

2. The multi-band RF front-end circuit of claim 1, wherein the respective tap impedance of a respective one of the plurality of antenna tap points is a function of a non-zero horizontal distance or a non-zero vertical distance of the respective one of the plurality of antenna tap points on the antenna circuit.

3. The multi-band RF front-end circuit of claim 1, wherein the respective RF isolation between the respective one of the plurality of RF circuits and each of the one or more related RF circuits corresponds to a relative distance between a respective one of the plurality of antenna tap points coupled to the respective one of the plurality of RF circuits and a respective one of the one or more related antenna tap points.

4. The multi-band RF front-end circuit of claim 3, wherein the respective RF isolation between the respective one of the plurality of RF circuits and each of the one or more related RF circuits further corresponds to a relative orientation between the respective one of the plurality of antenna tap points coupled to the respective one of the plurality of RF circuits and the respective one of the one or more related antenna tap points.

5. The multi-band RF front-end circuit of claim 4, wherein the relative orientation comprises one of a linear orientation and an orthogonal orientation.

6. The multi-band RF front-end circuit of claim 1, wherein:
   the plurality of RF circuits comprises a plurality of low-noise amplifier (LNA) circuits each having a respective noise impedance and is configured to amplify a respective one of a plurality of RF receive signals received in a respective RF receive band and a respective receive polarization; and
   the plurality of antenna tap points comprises a plurality of receive tap points each coupled to a respective one of the plurality of LNA circuits and is configured to receive and provide the respective one of the plurality of RF receive signals to the respective one of the plurality of LNA circuits, each of the plurality of receive tap points is positioned on the antenna circuit to:

present a respective receive drive impedance to thereby match the respective noise impedance of the respective one of the plurality of LNA circuits; and distance from one or more related receive tap points among the plurality of receive tap points to thereby provide a respective receive isolation between the respective one of the plurality of LNA circuits and each of one or more related LNA circuits among the plurality of LNA circuits that are coupled respectively to the one or more related receive tap points.

7. The multi-band RF front-end circuit of claim 6, wherein the respective one of the plurality of receive tap points is linearly oriented to a respective one of the one or more related receive tap points on the antenna circuit when the respective one of the RF receive signals received by the respective one of the plurality of receive tap points and a respective one of the plurality of RF receive signals received by the respective one of the one or more related receive tap points are in a same receive polarization but different RF receive bands.

8. The multi-band RF front-end circuit of claim 6, wherein the respective one of the plurality of receive tap points is orthogonally oriented to a respective one of the one or more related receive tap points on the antenna circuit when the respective one of the RF receive signals received by the respective one of the plurality of receive tap points and a respective one of the plurality of RF receive signals received by the respective one of the one or more related receive tap points are in a same RF receive band but different receive polarizations.

9. The multi-band RF front-end circuit of claim 6, further comprising a plurality of receive coupling circuits each provided between a respective one of the plurality of LNA circuits and a respective one of the plurality of receive tap points and is configured to present the respective noise impedance to the respective one of the plurality of receive tap points when the respective one of the plurality of LNA circuits is deactivated.

10. The multi-band RF front-end circuit of claim 9, wherein the plurality of receive coupling circuits each comprises an out-band matching circuit configured to reduce a respective out-of-band loading caused by the respective one of the plurality of LNA circuits that is deactivated.

11. The multi-band RF front-end circuit of claim 1, wherein:

the plurality of RF circuits comprises a plurality of power amplifier (PA) circuits each having a respective load impedance and configured to amplify a respective one of a plurality of RF transmit signals for transmission in a respective RF transmit band and a respective transmit polarization; and the plurality of antenna tap points comprises a plurality of transmit tap points each coupled to a respective one of the plurality of PA circuits and configured to receive the respective one of the plurality of RF transmit signals from the respective one of the plurality of PA circuits, each of the plurality of transmit tap points is positioned on the antenna circuit to:

present a respective transmit drive impedance to thereby match the respective load impedance of the respective one of the plurality of PA circuits; and distance from one or more related transmit tap points among the plurality of transmit tap points to thereby provide a respective transmit isolation between the respective one of the plurality of PA circuits and each of one or more related PA circuits among the plurality of PA circuits that are coupled respectively to the one or more related transmit tap points.

12. The multi-band RF front-end circuit of claim 11, wherein the respective one of the plurality of transmit tap points is linearly oriented to a respective one of the one or more related transmit tap points on the antenna circuit when the respective one of the RF transmit signals received by the respective one of the plurality of transmit tap points and a respective one of the plurality of RF transmit signals received by the respective one of the one or more related transmit tap points are in a same transmit polarization but different RF transmit bands.

13. The multi-band RF front-end circuit of claim 11, wherein the respective one of the plurality of transmit tap points is orthogonally oriented to a respective one of the one or more related transmit tap points on the antenna circuit when the respective one of the RF transmit signals received by the respective one of the plurality of transmit tap points and a respective one of the plurality of RF transmit signals received by the respective one of the one or more related transmit tap points are in a same RF transmit band but different transmit polarizations.

14. The multi-band RF front-end circuit of claim 11, further comprising a plurality of transmit coupling circuits each provided between a respective one of the plurality of PA circuits and a respective one of the plurality of transmit tap points and is configured to present the respective load impedance to the respective one of the plurality of transmit tap points when the respective one of the plurality of PA circuits is deactivated.

15. The multi-band RF front-end circuit of claim 14, wherein the plurality of transmit coupling circuits each comprises an out-band matching circuit configured to reduce a respective out-of-band loading caused by the respective one of the plurality of PA circuits that is deactivated.

16. The multi-band RF front-end circuit of claim 1, wherein:

the plurality of RF circuits comprises a plurality of low-noise amplifier (LNA) circuits each having a respective noise impedance and configured to amplify a respective one of a plurality of RF receive signals received in a respective RF receive band and a respective receive polarization;

the plurality of RF circuits comprises a plurality of power amplifier (PA) circuits each having a respective load impedance and is configured to amplify a respective one of a plurality of RF transmit signals for transmission in a respective RF transmit band and a respective transmit polarization;

the plurality of antenna tap points comprises a plurality of receive tap points each coupled to a respective one of the plurality of LNA circuits and is configured to receive and provide the respective one of the plurality of RF receive signals to the respective one of the plurality of LNA circuits, each of the plurality of receive tap points is positioned on the antenna circuit to:

present a respective receive drive impedance to thereby match the respective noise impedance of the respective one of the plurality of LNA circuits; and distance from one or more related receive tap points among the plurality of receive tap points to thereby provide a respective receive isolation between the respective one of the plurality of LNA circuits and each of one or more related LNA circuits among the plurality of LNA circuits that are coupled respectively to the one or more related receive tap points; and the plurality of antenna tap points comprises a plurality of transmit tap points each coupled to a respective one of the plurality of PA circuits and is configured to receive the respective one of the plurality of RF transmit signals from the respective one of the plurality of PA circuits, each of the plurality of transmit tap points is positioned on the antenna circuit to:

present a respective transmit drive impedance to thereby match the respective load impedance of the respective one of the plurality of PA circuits; and distance from one or more related transmit tap points among the plurality of transmit tap points to thereby provide a respective transmit isolation between the respective one of the plurality of PA circuits and each of one or more related PA circuits among the plurality of PA circuits that are coupled respectively to the one or more related transmit tap points.

17. The multi-band RF front-end circuit of claim 16, wherein:

the respective one of the plurality of receive tap points is linearly oriented to a respective one of the one or more related receive tap points on the antenna circuit when the respective one of the RF receive signals received by the respective one of the plurality of receive tap points and a respective one of the plurality of RF receive signals received by the respective one of the one or more related receive tap points are in a same receive polarization but different RF receive bands; and the respective one of the plurality of transmit tap points is linearly oriented to a respective one of the one or more related transmit tap points on the antenna circuit when the respective one of the RF transmit signals received by the respective one of the plurality of transmit tap points and a respective one of the plurality of RF transmit signals received by the respective one of the one or more related transmit tap points are in a same transmit polarization but different RF transmit bands.

18. The multi-band RF front-end circuit of claim 16, wherein:

the respective one of the plurality of receive tap points is orthogonally oriented to a respective one of the one or more related receive tap points on the antenna circuit when the respective one of the RF receive signals received by the respective one of the plurality of receive tap points and a respective one of the plurality of RF receive signals received by the respective one of the one or more related receive tap points are in a same RF receive band but different receive polarizations; and the respective one of the plurality of transmit tap points is orthogonally oriented to a respective one of the one or more related transmit tap points on the antenna circuit when the respective one of the RF transmit signals received by the respective one of the plurality of transmit tap points and a respective one of the plurality of RF transmit signals received by the respective one of the one or more related transmit tap points are in a same RF transmit band but different transmit polarizations.

19. The multi-band RF front-end circuit of claim 16, further comprising:

a plurality of receive coupling circuits each provided between a respective one of the plurality of LNA circuits and a respective one of the plurality of receive tap points and configured to present the respective noise impedance to the respective one of the plurality of receive tap points when the respective one of the plurality of LNA circuits is deactivated; and a plurality of transmit coupling circuits each provided between a respective one of the plurality of PA circuits and a respective one of the plurality of transmit tap points and configured to present the respective load impedance to the respective one of the plurality of transmit tap points when the respective one of the plurality of PA circuits is deactivated.

20. The multi-band RF front-end circuit of claim 19, wherein:

the plurality of receive coupling circuits each comprises a respective out-band matching circuit configured to reduce a respective out-of-band loading caused by the respective one of the plurality of LNA circuits that is deactivated; and the plurality of transmit coupling circuits each comprises a respective out-band matching circuit configured to reduce a respective out-of-band loading caused by the respective one of the plurality of PA circuits that is deactivated.

21. The multi-band RF front-end circuit of claim 16, wherein the plurality of antenna transmit tap points and the plurality of antenna receive tap points are positioned with respective physical distances and/or respective orthogonal orientations to thereby provide isolations between the plurality of transmit PA circuits and the plurality of receive LNA circuits.

22. The multi-band RF front-end circuit of claim 16, wherein the plurality of receive tap points and the plurality of transmit tap points are provided on one of: a patch antenna, a patch antenna with inset, an F-antenna, and an inverted-F antenna.

* * * * *

UNITED STATES PATENT AND TRADEMARK OFFICE
CERTIFICATE OF CORRECTION

| | | |
|---|---|---|
| PATENT NO. | : 11,626,892 B1 | Page 1 of 1 |
| APPLICATION NO. | : 17/665687 | |
| DATED | : April 11, 2023 | |
| INVENTOR(S) | : George Maxim et al. | |

It is certified that error appears in the above-identified patent and that said Letters Patent is hereby corrected as shown below:

In the Specification

Column 7, Line 9, replace "$X_A, X_B, X_D$" with --$X_A, X_B, X_C, X_D$--.
Column 7, Line 37, replace "$TP_{XA}, TP_{XB}, TP_{XC}, TP_{XC}, TP_{YA}, TP_{YB}$" with --$TP_{XA}, TP_{XB}, TP_{XC}, TP_{XD}, TP_{YA}, TP_{YB}$--.

Signed and Sealed this
Twenty-fourth Day of October, 2023

Katherine Kelly Vidal
*Director of the United States Patent and Trademark Office*